(12) United States Patent
Nozato et al.

(10) Patent No.: US 6,357,802 B1
(45) Date of Patent: Mar. 19, 2002

(54) PIPE OF HARD THERMOPLASTIC RESIN, PIPE JOINT STRUCTURE AND METHODS OF MANUFACTURING THE SAME

(75) Inventors: Nobuhiro Nozato, Takarazuka; Atsushi Inagaki, Tenri; Shinichi Matsumoto, Toyonaka; Hajime Komada; Mitsuteru Mutsuda, both of Himeji; Masanori Hiraishi, Osaka, all of (JP)

(73) Assignees: Mikuni Plastics Co., Ltd., Osaka; Daicel-Hüls, Ltd., Tokyo; Daicel Chemical Industries, Ltd., Osaka, all of (JP)

( * ) Notice: Subject to any disclaimer, the term of this patent is extended or adjusted under 35 U.S.C. 154(b) by 0 days.

(21) Appl. No.: 09/486,252
(22) PCT Filed: Dec. 24, 1998
(86) PCT No.: PCT/JP98/05929
§ 371 Date: Feb. 24, 2000
§ 102(e) Date: Feb. 24, 2000
(87) PCT Pub. No.: WO99/34142
PCT Pub. Date: Jul. 8, 1999

(30) Foreign Application Priority Data

Dec. 24, 1997 (JP) .............................. 9-355017
Jun. 30, 1998 (JP) ............................. 10-184612
Nov. 20, 1998 (JP) ............................. 10-331276

(51) Int. Cl.⁷ .............................................. F16L 21/02
(52) U.S. Cl. ................... 285/340; 285/39; 285/321; 285/339; 285/423; 264/135; 264/269; 264/297.1; 264/297.2; 264/297.8; 525/166
(58) Field of Search ...................... 525/166; 264/269, 264/135, 297.1, 297.2, 297.8; 285/39, 423, 340, 339, 321

(56) References Cited

U.S. PATENT DOCUMENTS 2,541,379 A * 2/1951 Ord ........................ 264/297.1
3,920,270 A * 11/1975 Babb, Jr. .................... 285/104

(List continued on next page.)

FOREIGN PATENT DOCUMENTS

EP          0125149 A1 * 11/1984 ................ 285/340
JP          55149479 A     11/1980

(List continued on next page.)

OTHER PUBLICATIONS

Lindeburg, Michael, Mechanical Engineering Reference Manual for the PE Exam, 10th edition, May 1997, pp. 45–13, 45–17, 63–10.*

*Primary Examiner*—B. Dayoan
*Assistant Examiner*—Carlos Lugo
(74) *Attorney, Agent, or Firm*—Birch, Stewart, Kolasch & Birch, LLP

(57) ABSTRACT

An air-pressure joint 1 comprising a pipe main body 2 made of a rigid thermoplastic resin and a release ring 3 made of a rigid thermoplastic resin inserted from one opening of the pipe main body, wherein the release ring includes a slip-off preventing protrusion 13 on an outer circumferential surface of its insertion site; and the pipe main body 2 includes a ring-shaped sealing portion 9 made of an elastic resin and integrally formed on an inner circumferential surface thereof, an insertion mouth pipe portion 7 made of a rigid rigid resin, coaxially disposed to abut one opening side portion of the pipe main body 2 and forming a recess groove 10 on an inner circumferential surface of an abutting portion thereof for stopping the slip-off preventing protrusion 13 of the release ring 3, and a ring-shaped connecting portion 8 made of a rigid synthetic resin and integrally molded to an outer circumferential surface of the abutting portion of this mouth pipe for connecting the insertion mouth pipe portion 7 to the pipe main body 2.

12 Claims, 16 Drawing Sheets

U.S. PATENT DOCUMENTS

| | | | |
|---|---|---|---|
| 3,989,787 A | * 11/1976 | Scott, Jr. et al. | 264/114 |
| 4,036,512 A | * 7/1977 | Francis | 285/111 |
| 4,076,282 A | * 2/1978 | Scott, Jr. et al. | 285/156 |
| 4,362,688 A | * 12/1982 | Nakagawa | 264/503 |
| 4,519,567 A | * 5/1985 | Rautenberg | 249/57 |
| 4,566,704 A | 1/1986 | van Dongeren | |
| 4,664,428 A | * 5/1987 | Bridges | 285/373 |
| 4,743,422 A | 5/1988 | Kalriis-Nielsen et al. | |
| 5,160,179 A | * 11/1992 | Takagi | 285/340 |
| 5,197,768 A | * 3/1993 | Conner | 285/105 |
| 5,988,695 A | * 11/1999 | Corbett, Jr. | 285/110 |
| 6,174,002 B1 | * 1/2001 | Rho | 285/340 |

FOREIGN PATENT DOCUMENTS

| | | | |
|---|---|---|---|
| JP | A-58219255 | 12/1983 | |
| JP | 61215881 A | 9/1986 | |
| JP | A-7317972 | 12/1995 | |
| JP | A-8 47981 | 2/1996 | |
| JP | 08047981 A | * 2/1996 | 264/297.1 |

* cited by examiner

樹脂注入

PIPE OF HARD THERMOPLASTIC RESIN, PIPE JOINT STRUCTURE AND METHODS OF MANUFACTURING THE SAME

This application is the national phase under 35 U.S.C. § 371 of PCT International Application No. PCT/JP98/05929 which has an International filing date of Dec. 24, 1998, which designated the United States of America.

FIELD OF ART

This invention relates to a pipe made of a rigid thermoplastic resin, a pipe joint structure, and manufacturing methods thereof, and more particularly to a pipe made of a rigid thermoplastic resin which is suitable as a pipe joint incorporating a sealing structure, a specific pipe joint structure, and their manufacturing methods.

BACKGROUND ART

A pipe joint, for example, an air-pressure joint usually secures a seal between an outer side (atmospheric air side) and an inner side (high pressure side) by using a non-integral O-ring or a ring-shaped gasket between a joint main body (pipe main body) and a pipe to be connected.

Further, a rigid synthetic resin is used for the joint main body; and a rubber or a flexible synthetic resin having an elasticity is used for the O-ring or the ring-shaped gasket, respectively.

However, since the O-ring is a flexible component which is smaller relative to the joint main body, and moreover, an attachment position is at an inner surface of the joint main body where the attaching is difficult, there has been a problem that an entanglement (twist) is generated in connecting with the pipe to be connected or in assembling the joint main body, causing leakage of a fluid or providing poor workability.

DISCLOSURE OF THE INVENTION

This invention provides a pipe made of a rigid thermoplastic resin in which a ring-shaped projection comprising an elastic resin and having a sealing property is integrally molded to an inner surface thereof thermoplastically.

In other words, this invention makes it possible to prevent generation of entanglement (twist) or leakage of a fluid and also makes it possible to improve the poorness of the operability accompanying the mounting, by integrally molding a pipe main body and a ring-shaped projection (which may be hereafter referred to as a ring-shaped projecting streak) streak having a sealing property along its inner surface directly (without intervention of a third component such as an adhesive) with a combination of a specific rigid thermoplastic resin and a specific elastic resin, respectively.

Now, the rigid thermoplastic resin to be used for the pipe (pipe main body) in the present invention may be, for example, a polyphenylene ether resin (a polyphenylene oxide resin), a polyamide resin, a polyester resin, a polyvinyl chloride resin, or an AS resin. Specifically, the polyester resin may be polybutylene terephthalate; the polyphenylene ether resin may be a mixture of polyphenylene ether and impact-resistant polystyrene; and the polyamide may be polyamide 46, polyamide 6, polyamide 66, polyamide 12, polyamide 612, polyamide 610 and the like, as preferable examples.

On the other hand, the elastic resin to be used for the ring-shaped projecting streak may be, for example, a butadiene-acrylonitrile rubber, a styrene-butadiene rubber, a nitrile rubber, a natural rubber, an ethylene propylene rubber, a chloroprene rubber, a fluorine rubber, a silicone rubber or a mixture thereof. Specifically, diene elastomers such as a butadiene rubber, a styrene-butadiene rubber, a chloroprene rubber, a butadiene-acrylonitrile rubber (a nitrile butadiene rubber) and the like, non-diene elastomers such as a isobutylene-isoprene copolymer, an ethylene-propylene, copolymer, chlorosulfonated polyethylene, chlorinated polyethylene and the like, thermoplastic elastomers such as a block copolymer of styrene and butadiene or isoprene, natural rubbers and the like are given as examples. These elastomers may be vulcanized and also may have a carboxyl group introduced by acrylic acid, methacrylic acid, sorbic acid or the like.

By combining the rigid thermoplastic resin and the elastic resin as mentioned above as materials for the pipe main body and the ring-shaped projection, the two can be integrally bonded thermoplastically. For details of further example materials and condition combinations, reference is made to each of Japanese Unexamined Patent Publication No. SHO 62(1987)-21244, Japanese Unexamined Patent Publication No. HEI 01(1989)-149854, Japanese Unexamined Patent Publication No. HEI 02(1990)-150439, Japanese Unexamined Patent Publication No. HEI 03(1991)-133631, Japanese Unexamined Patent Publication No. HEI 03(1991)-138144, Japanese Examined Patent Publication No. HEI 05(1993)-30182, Japanese Unexamined Patent Publication No. HEI 07(1995)-11013 and Japanese Examined Patent Publication No. HEI 08(1996)-18412.

In the present invention, the "sealing property" for the ring-shaped projecting streak means that the sealing (seal) can be made by pressing contact with a tube to be connected, and is a property that can be obtained from use of the above-mentioned elastic resin by its physical property.

The pipe made of a rigid thermoplastic resin pertaining to the present invention can be manufactured by using materials and combinations as mentioned above by means of a manufacturing method such as follows.

In other words, the pipe made of a rigid thermoplastic resin pertaining to the present invention is manufactured by simultaneously or successively passing through a pipe main body molding step for molding a pipe main body and a ring-shaped projecting streak molding step for disposing a ring-shaped projecting streak on an inner surface of the pipe main body.

In the pipe main body molding step, the pipe main body is molded by injecting a molten material of the rigid thermoplastic resin (a source material of the rigid thermoplastic resin) into a tubular cavity (gap) formed by a set of molds which are splittable into a plurality.

Next, in the ring-shaped projecting streak molding step, the ring-shaped projecting streak made of the elastic resin and having the sealing property is integrally molded thermoplastically on an inner surface of the pipe main body by injecting a molten material of the elastic resin (concretely, an unvulcanized molten body as a source material or a material of a rubber) into a ring-shaped cavity formed a long the inner surface of the pipe main body by the molds themselves or combining another mold and vulcanizing it.

On the other hand, in the case where this ring-shaped projecting streak is to be molded simultaneously with the pipe main body, a manufacturing method of a pipe made of a rigid thermoplastic resin can be provided which comprises injecting, into a cavity formed by the splittable molds and comprising a pipe-shaped portion and a ring-shaped portion located along an inner surface of this pipe-shaped portion, a molten material of the rigid thermoplastic resin into the pipe-shaped portion and a molten material of the elastic resin into the ring-shaped portion of the cavity for simultaneous integral molding to obtain the pipe made of the rigid thermoplastic resin having the ring-shaped projecting streak on the inner surface of the pipe main body.

Here, if an injection inlet is formed in an inner mold of the molds, the material of the elastic resin in a molten state can be injected into the ring-shaped cavity located along the inner surface of the pipe main body. However, it is convenient if a through-hole is formed beforehand in a trunk portion of the pipe main body (using a slide pin) and the material of the elastic resin in a molten state is injected into the ring-shaped cavity using the through hole.

In the manner mentioned above, the ring-shaped projecting streak having a sealing property and made of an elastic resin is molded in a thermoplastically and integrally bonded state along the inner surface of the pipe main body made of the rigid thermoplastic resin by the pipe main body molding step and the ring-shaped projecting streak molding step.

The obtained pipe made of the rigid thermoplastic resin is convenient for connection of tubes and is especially suitable as a pipe joint that passes a pressurized gas containing air inside, water, oil or the like relative to the outside ambient air, because a sealing effect that does not allow passing of a gas such as air or liquid can be obtained when another tube is brought into close contact with the ring-shaped projecting streak having the sealing property, and a mounting operation of a separate O-ring or the like can be omitted.

Regarding the shape of the pipe joint, it can be applied to an L-shaped one (Elbow), a T-shaped one (T), a U-shaped one (U) or the like in addition to straight tubes in which the fundamental cross-section of the pipe is made into a circular shape, an elliptical shape, a square shape or the like.

Also, a connection structure of these pipe joints with a pipe to be connected, i.e. the pipe joint structure, may be concretely a pipe joint structure comprising a pipe main body composed of a rigid thermoplastic resin, a ring-shaped projecting streak made of an elastic resin and molded integrally along an inner surface of the pipe main body and having a sealing property, a release ring held at an opening of the pipe main body to be movable in an axial direction, and a locking spring which presses a trunk surface of the pipe to be connected that is inserted via the release ring to maintain a close contact state of the pipe to be connected and the ring-shaped projecting streak, and which deforms to release the pressing when the release ring is subjected to a moving operation inwards along the axial direction, thereby to enable insertion and detachment of the pipe to be connected. Here, these joint structures are not limited to simple pressing-in in the axial direction which is given as an embodiment, but may be a screwing (threaded engagement).

Also, the cross-sectional shape of the ring-shaped projection can be appropriately molded into a quadrangle, a trapezoid, a triangle, a semicircle, a U-shape, a V-shape or the like in a natural state depending on the relationship with the molding mold, the contact relationship with the pipe to be connected, the required extent of the sealing degree, and the like.

Concretely as a pipe joint structure, the present invention can provide a pipe joint structure comprising a pipe main body and a cap nut that is screwed to at least one opening of this pipe main body, in which a ring-shaped sealing portion (a ring-shaped projection or a projecting streak, the same applies hereafter) made of an elastic resin for sealing a pipe to be connected and/or the pipe main body is integrally formed on an inner surface (which may be hereafter referred to as inner circumferential surface of the pipe main body or the cap nut.

Here, specific example of the elastic resin as a material for the ring-shaped sealing portion and the resin made of the rigid thermoplastic resin as a material of an object portion of the pipe main body or the cap nut to which the ring-shaped sealing portion is integrally formed, are similar to those of the previously-mentioned case of the pipe made of a rigid thermoplastic resin, so that an explanation will be omitted.

According to another aspect, the present invention provides a pipe joint structure comprising a pipe main body and a connector inserted from one opening of the pipe main body, wherein the connector is formed of a rigid thermoplastic resin or a metal and includes a slip-off preventing protrusion on an outer circumferential surface of its insertion site; the pipe main body comprises a main body portion made of a rigid thermoplastic resin, an insertion mouth pipe portion made of a rigid thermoplastic resin which is molded separately from the main body portion and allowed to coaxially abut the main body portion to be integrally connected therewith, and a ring-shaped sealing portion made of an elastic resin which is integrally formed on an inner circumferential surface of the main body portion for sealing a tube to be connected that is inserted via the connector or the connector; and a recess groove is formed on an inner circumferential surface of an abutting portion of the main body portion and the insertion mouth pipe portion for engaging or engagingly stopping the slip-off preventing protrusion of the connector.

In other words, one of the constructional characteristics of the present invention is that a ring-shaped sealing portion made of an elastic resin is integrally formed on an inner circumferential surface of the main body portion made of the rigid thermoplastic resin, and also the main body portion and the insertion mouth pipe portion are coaxially abutted and integrally connected to form a recess groove on an inner circumferential surface of the abutting portion. Especially, it can be made into an inexpensive and high-sealing pipe joint structure by integrally forming the main body portion and the ring-shaped sealing portion with a combination of a specific rigid thermoplastic resin and a specific elastic resin, and by dividing the pipe main body along a plane that passes through the recess groove (the main body portion and the insertion mouth pipe portion) and molding them beforehand and then integrally connecting them.

In the present invention, the main body portion and the insertion mouth pipe portion are molded as separate bodies beforehand and then integrally connected concretely, they are integrally connected by integrally molding or winding a ring-shaped connecting portion (material) made of a rigid thermoplastic resin on an outer circumferential surface portion of an abutting portions of the two portions, welding or bonding the abutting portions of the two portions, or combining these.

In the present invention, the rigid thermoplastic resin and the metal to be used as the connector are not specifically limited. However, the rigid thermoplastic resin of the above-mentioned pipe main body and brass are given as preferable ones.

In the present invention, the slip-off preventing protrusion of the connector being engaged or engagingly stopped in the recess groove means that the slip-off protrusion fittingly falls into, is forcibly pressed into, or loosely enter the recess groove to stop at a wall of the recess groove.

According to another aspect, the present invention provides a manufacturing method of a pipe joint structure in which the pipe joint structure is obtained by molding each of a pipe main body and a connector, and inserting the molded connector into the molded pipe main body, wherein a step of molding the pipe main body comprises:

(1) a main body portion molding step for molding the main body portion by injecting a molten material of a rigid thermoplastic resin into a pipe-shaped cavity formed by splittable molds;

(2) a sealing portion forming step for integrally forming a ring-shaped sealing portion made of an elastic resin on an inner circumferential surface of the main body portion by injecting a molten material of the elastic resin into a small cavity formed on the inner circumferential surface of the main body portion by moving a part of an inner mold among the molds;

(3) an insertion mouth pipe portion molding step for molding an insertion mouth pipe portion by injecting a molten material of a rigid thermoplastic resin into a pipe-shaped cavity formed by other splittable molds; and (4) a pipe main body forming step for forming the pipe main body in which the main body portion and the insertion mouth pipe portion are integrally connected, by coaxially and abuttingly disposing the molded insertion mouth portion and the molded main body portion and injecting a molten material of a rigid thermoplastic resin into a cavity formed by still another mold on an outer circumferential surface portion of the abutting portion to mold a ring-shaped connecting portion.

According to still another aspect, the present invention provides a manufacturing method of a pipe joint structure comprising integrally forming a ring-shaped rubber layer (a ring-shaped projection or projecting streak) thermoplastically on an inner circumferential surface of a pipe made of a rigid thermoplastic resin to obtain a pipe joint incorporating a sealing structure, by making an unvulcanized rubber (i.e., a clay-like source material or material of a rubber) into a ring-shape and performing vulcanization while allowing a close contact with the pipe made of the rigid thermoplastic resin.

In other words, in the present invention, by vulcanizing an unvulcanized ring-shaped rubber while keeping it in close contact with an inner circumferential surface of a pipe made of a rigid thermoplastic resin, since an unvulcanized rubber can be made into a viscous fluid by heating, the unvulcanized rubber can be vulcanized after it is brought into close contact and deformed in accordance with a shape of an inner surface of the pipe by utilizing its large deforming property and shape-retaining property. Therefore, the vulcanized rubber can be brought into close contact with the inner circumferential surface of the pipe in a free state instead of elastic deformation, so that a large sealing effect can be obtained, and it is made possible to provide a pipe joint having a high reliability in which leakage of a fluid caused by a weld, line of the pipe is not generated. Also, since the pipe made of a rigid thermoplastic resin and a ring-shaped rubber for sealing, which were separate components in the prior art, are integrally molded beforehand (before it is used as a pipe joint), the problems associated with aggravation of the assembling property and the operability by twisting or entanglement of the aforementioned ring-shaped rubber for sealing or the ring-shaped gasket can be eliminated.

Now, in the manufacturing method of the pipe joint pertaining to the present invention, the "pipe joint" as an object of manufacture means a joint for connecting two or more pipes (pipes to be connected), and the pipe joint incorporating a sealing structure means that a structure for connecting each pipe to be connected in a sealed state (close contact state) is provided in the inside.

Also, a pipe or a pipe main body (hereafter referred to as a pipe main body) is used as a main body of the pipe joint. As a material of the pipe main body, a rigid thermoplastic resin is given as an example. Specifically, a polyphenylene ether resin, a polyamide resin, a polyester resin, a polyvinyl chloride or an AS resin are given as preferable ones.

On the other hand, an unvulcanized natural rubber or synthetic rubber is used for integrally forming a ring-shaped rubber layer for sealing, on an inner circumferential surface of the pipe main body made of these rigid thermoplastic resins. Specifically, a rubber made of a natural rubber, a butadiene-acrylonitrile rubber, a styrene butadiene rubber, a nitrile rubber, an ethylene propylene rubber, a chloroprene rubber, a fluorine rubber, a silicone rubber or a mixture of these is suitably used.

Further, the above-mentioned ring-shaped unvulcanized rubber is disposed into a close contact state on an inner circumferential surface of the pipe main body made of the above-mentioned rigid thermoplastic resin and thereafter the ring-shaped unvulcanized rubber is vulcanized by adding a heat, whereby a ring-shaped rubber layer having a sealing property is integrally formed on the inner circumferential surface of the pipe main body. Here, in order to integrally form the pipe main body and the ring-shaped rubber layer without using an adhesive or the like, it is preferable to use a pipe main body made of a specific rigid thermoplastic resin and a ring-shaped unvulcanized rubber of a specific material property. As a combination thereof, the following combinations may be given as examples.

(1) A combination of a polyphenylene ether resin and an unvulcanized rubber comprising a styrene butadiene rubber (hereafter referred to as an SBR rubber), a natural rubber (hereafter referred to as an NR rubber), an ethylene propylene rubber (hereafter referred to as an EP rubber), or a nitrile rubber (hereafter referred to as an NBR rubber).

(2) A combination of a polyamide resin and an unvulcanized rubber comprising an NBR rubber, an EP rubber, a silicone rubber, or a fluorine rubber.

(3) A combination of a polyester resin and an EP rubber or a silicone rubber.

(4) A combination of an AS resin and an unvulcanized rubber comprising an NBR rubber.

(5) Further, a combination of a polyphenylene ether resin, a polyamide resin, a polyester resin, or an AS resin as above-mentioned, and an unvulcanized rubber comprising a mixture of an SBR rubber, an NBR rubber, an EP rubber, an NR rubber, a silicone rubber and a fluorine rubber and the like as mentioned above.

In the above combinations, the most suitable combination is selected in accordance with an intended usage of the pipe joint. Also, a paraffin or a naphthene oil as a flexibleening agent; a carbon black, a white carbon (silica) as a reinforcing agent; a stearic acid as an activating agent; a zinc white, N-cyclohexyl-2, BDMA, TAIC as a vulcanization promoting agent; a sulfur, a surface-treated sulfur, an organic peroxide, magnesium oxide, or a polyamine as a vulcanizing agent and the like are blended beforehand into the unvulcanized rubber, and its blending is suitably changed and selected in accordance with the intended usage.

Also, the unvulcanized rubber material is formed into a ring shape beforehand. The method for forming into the ring-shape may be, for example, a method of forming an unvulcanized rubber material into a thin plate shape and stamping out the plate-shaped unvulcanized rubber into a ring-shape; a method of slicing it after extruding it into a hollow tube shape; a method in which the rubber material extruded into an elongated strand shape is cut to a predetermined length and then winding it in a circular shape for forming; and the like.

The ring-shaped unvulcanized rubber thus formed can be made into a flexible clay form and has an extremely large deformability because it is unvulcanized in a literal sense of the word. This large deformability allows close adhesion in correspondence with the shape of the inner circumferential surface of the pipe main body. However, because of this large deformability, the rubber may conversely have a low shape-retainability. In such a case, an auxiliary method is necessary for allowing the rubber to be kept in close contact with a predetermined position on the inner circumferential surface of the pipe main body until the time of vulcanization (heating) while maintaining the shape of the ring-shaped unvulcanized rubber.

As this method, there may be mentioned, for example, a method in which, after a ring-shaped unvulcanized rubber is disposed at a ring-shaped rubber layer formation site of the inner circumferential surface of the pipe main body, a cylindrical body or a tubular body made of a metal having a diameter which is approximately equal to or a little larger than the inner diameter of the ring-shaped unvulcanized rubber is inserted and, with its circumferential surface, the ring-shaped unvulcanized rubber is pressed to be kept in close contact with the inner circumferential surface of the pipe main body; a method in which a ring-shaped step portion is formed at a ring-shaped rubber layer formation site in the inside of the pipe main body, a ring-shaped unvulcanized rubber is disposed at the step section, and thereafter a cylindrical body or a tubular body made of a metal having a diameter which is approximately equal to or a little larger than the outer diameter of the ring-shaped unvulcanized rubber is inserted from an opening of the pipe main body and, with its end, the ring-shaped unvulcanized rubber is pressed to be kept in close contact with the inner circumferential surface of the pipe main body; and further a method in which a ring-shaped groove is formed beforehand at a ring-shaped rubber layer formation site on the inner circumferential surface of the pipe main body, a ring-shaped unvulcanized rubber is disposed in the ring-shaped groove, thereafter a cylindrical body or a tubular body made of a metal and having a diameter which is approximately equal to or a little larger than the inner diameter of the ring-shaped unvulcanized rubber is inserted and, with its circumferential surface, the ring-shaped unvulcanized rubber is pressed to be kept in close contact with the ring-shaped groove of the pipe main body.

Also, there may be mentioned, for example, a method in which a ring-shaped groove is formed on the inner circumferential surface of the pipe main body, a plurality of holes leading to an outer surface of the pipe main body from the bottom surface of the groove are formed approximately with equal angular spacing, a ring-shaped unvulcanized rubber is disposed in the groove, and thereafter suction is performed from the holes on the outside surface of the pipe to allow the ring-shaped unvulcanized rubber to be in close contact with the inner circumferential surface of the pipe main body; a method in which a heat-resistant rubber balloon is inflated in the inside of the pipe main body and a ring-shaped unvulcanized rubber is allowed to be kept in close contact with the inner circumferential surface of the pipe main body by a pressing force of the balloon.

Next, as a method for vulcanizing the ring-shaped unvulcanized rubber disposed and brought into close contact as mentioned above at a predetermined position of the inner surface of the pipe main body, there may be mentioned, for example, a method in which a cylindrical body or a tubular body made of a metal (for example, made of aluminum or copper) inserted for allowing the ring-shaped unvulcanized rubber to be in close contact with the inner circumferential surface of the pipe main body is heated to a predetermined temperature to transfer heat to the ring-shaped unvulcanized rubber via the cylindrical body or the tubular body for heating; a method in which the pipe main body having a cylindrical body or a tubular body made of a metal inserted into the ring of the unvulcanized rubber is heated as a whole in a high temperature tank of a predetermined temperature; and a method in which a cylindrical body or a tubular body made of a metal or made of a synthetic resin is inserted into the ring of the unvulcanized rubber to allow the unvulcanized rubber to be in close contact with the inner circumferential surface of the pipe main body and then, after the cylindrical body or the tubular body is drawn out, the remaining unvulcanized rubber and the pipe main body are heated in a high temperature tank.

By heating of the unvulcanized rubber by these methods, an additive agent, a vulcanizing agent, a vulcanization promoting agent, and a vulcanization promoting auxiliary agent and the like which have been kneaded beforehand into the unvulcanized rubber react with the rubber, whereby a ring-shaped rubber layer is formed which has a property suitable as a ring-shaped rubber layer having a sealing property and which is fixed in close contact with the inner circumferential surface of the main body to be integral with the main body.

BEST MODES FOR REDUCING THE INVENTION INTO PRACTICE

Figure 1:
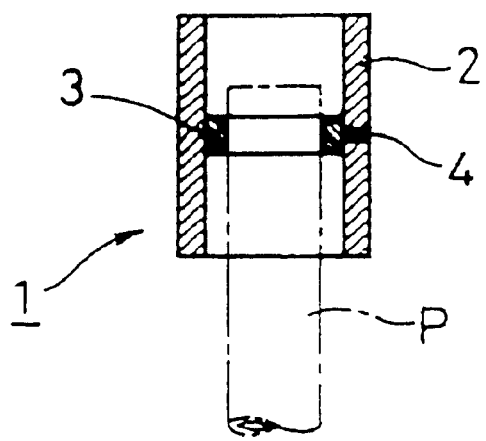
FIG. 1 is a cross-sectional view showing a pipe joint as one simple embodiment of a pipe made of a rigid thermoplastic resin according to the present invention.

Hereafter, the present invention will be described in detail based on the embodiments shown in the drawings. The present invention is not limited by this.

EMBODIMENT 1

Figure 2:
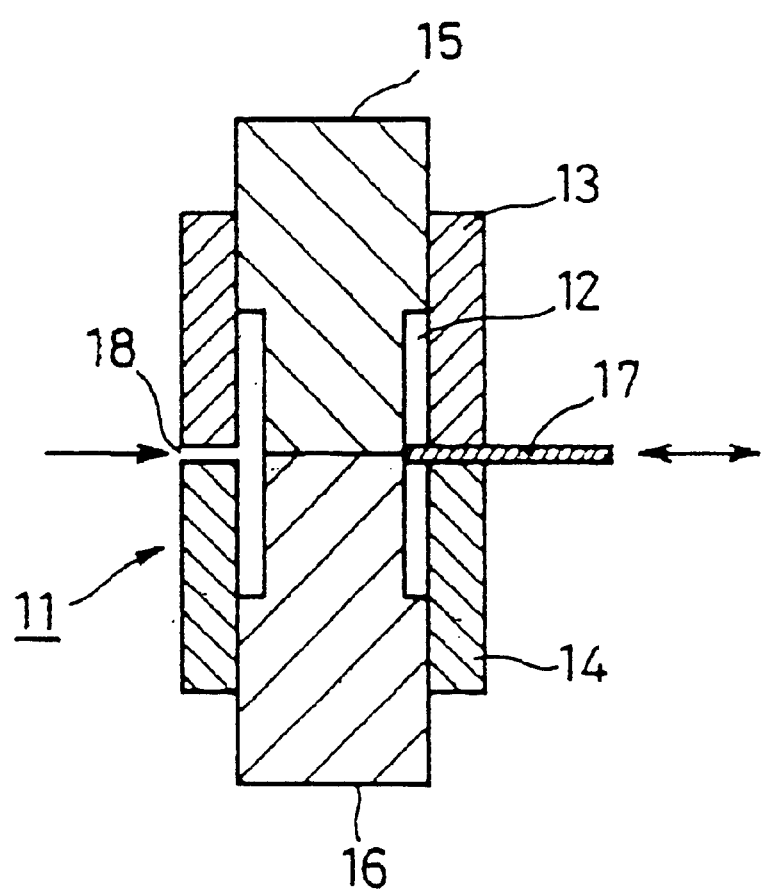
FIG. 2 is an explanatory view that explains a pre-step of a manufacturing method of the pipe joint shown in FIG. 1.

FIG. 1 is a cross-sectional view showing a pipe joint as one simple embodiment of a pipe made of a rigid thermoplastic resin according to the present invention; FIG. 2 is an explanatory view that explains a pre-step of a manufacturing method of the pipe joint; and FIG. 3 is a view corresponding to FIG. 2 and showing a post-step of the manufacturing method of the pipe joint.

Figure 3:
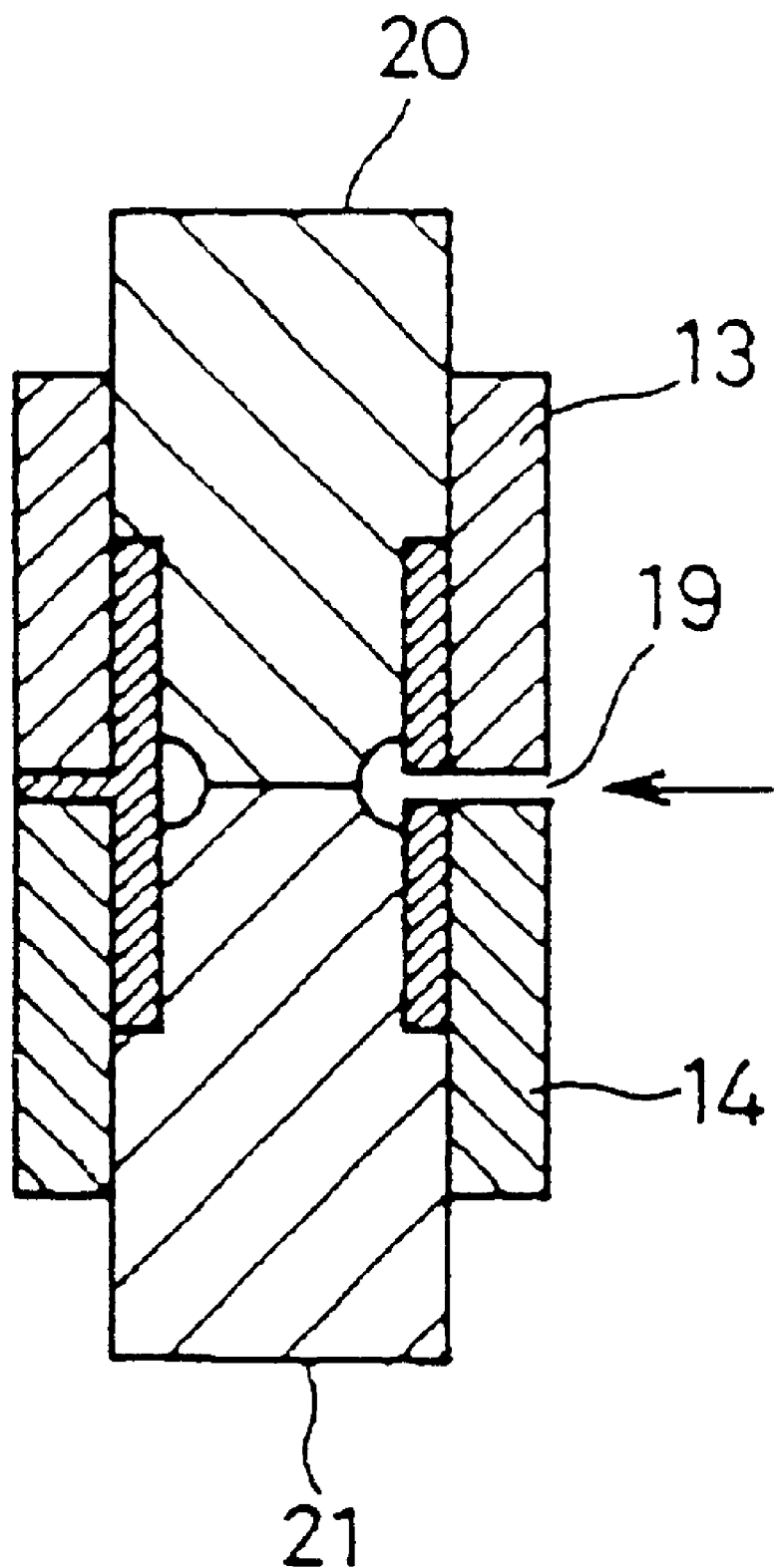
FIG. 3 is an explanatory view that explains a post-step of the manufacturing method of the pipe joint shown in FIG. 1.

Referring to FIG. 1 to 3, a pipe joint 1 includes a pipe main body 2 and a ring-shaped projecting streak 3 integrally formed along an inner surface of this pipe main body and having a sealing property. The pipe main body 2 is made of polybutylene terephthalate (hereafter simply referred to as PBT), and the ring-shaped projecting streak 3 is made of nitrile butadiene rubber (hereafter simply referred to as NBR). The pipe main body 2 and the ring-shaped projecting streak 3 are integrally bonded thermoplastically. Here, the numeral 4 represents an injection trace of NBR at the time of manufacture.

In the pipe joint 1 having the above construction, by inserting a pipe to be connected (rubber hose) P, an outer circumferential surface of the pipe P to be connected is elastically pressed by the ring-shaped projecting streak 3 having the sealing property, whereby a good sealing effect between it and the pipe P to be connected (for example, a high pressure gas within the pipe is sealed against an outside ambient air) is obtained.

Also, it is possible to make an improvement in occurrence of fluid leakage caused by generation of entanglement (twist) at the time of connection with the pipe to be connected or at the time of assembling the joint main body, and in the poorness of the operability accompanying the attachment.

Next, a manufacturing method of the pipe joint 1 having the above-mentioned construction will be explained.

1) Pipe Main Body Molding Step

First, referring to FIG. 2, an approximately pipe(tube)-shaped cavity 12 is formed with a mold 11 which is splittable into a plurality. The mold 11 includes an outer upper portion 13 having an approximately circular pipe (circular tube) shape, a similar outer lower portion 14, an approximately cylindrical inner upper portion 15 located in the inside of these outer upper and lower portions 13, 14, a similar inner lower portion 16, and a slide pin 17 that penetrates through a boundary portion of the outer upper and lower portions 13, 14 to traverse across the cavity 12. The numeral 18 represents a resin injection inlet. The outer upper portion 13 and the outer lower portion 14 can be split along a central axis in a longitudinal direction, and the inner upper portion 15 and the inner lower portion 16 can be split in an up-and-down direction.

Now, PBT in a molten state (about 245° C.) is injected into the cavity 12 through the resin injection inlet 18.

In a state in which the injected resin has been solidified, the inner upper portion 15 and the inner lower portion 16 are drawn out, and further the slide pin 17 is drawn out to form a gate 19. Here, the gate 19 may be formed by molding a straight tube first and then by separate drilling of the molded straight tube.

2) Ring-shaped Projecting Streak Molding Step

Next, referring to FIG. 3, a different mold: an inner upper portion 20 and an inner lower portion 21 are put into the inside, and NBR in a molten state (an unvulcanized molten body as a source material of a rubber, about 240° C.) is injected through the gate 19.

Upon solidification of the injected resin, all the molds 13, 14, 20, 21 on the inside and outside are removed, and a resin component injected and solidified in the resin injection inlet 18 and the gate 19 is removed to obtain a pipe joint 1 of FIG. 1. In the obtained pipe joint 1, its pipe main body 2 and the ring-shaped projecting streak 3 are integrally bonded chemically (thermoplastically) and mechanically, and the pipe to be connected can be connected by insertion as mentioned above.

As an alternative to the embodiment described above, ring-shaped projecting streaks of the pipe joint may be provided at two sites.

Figure 4:
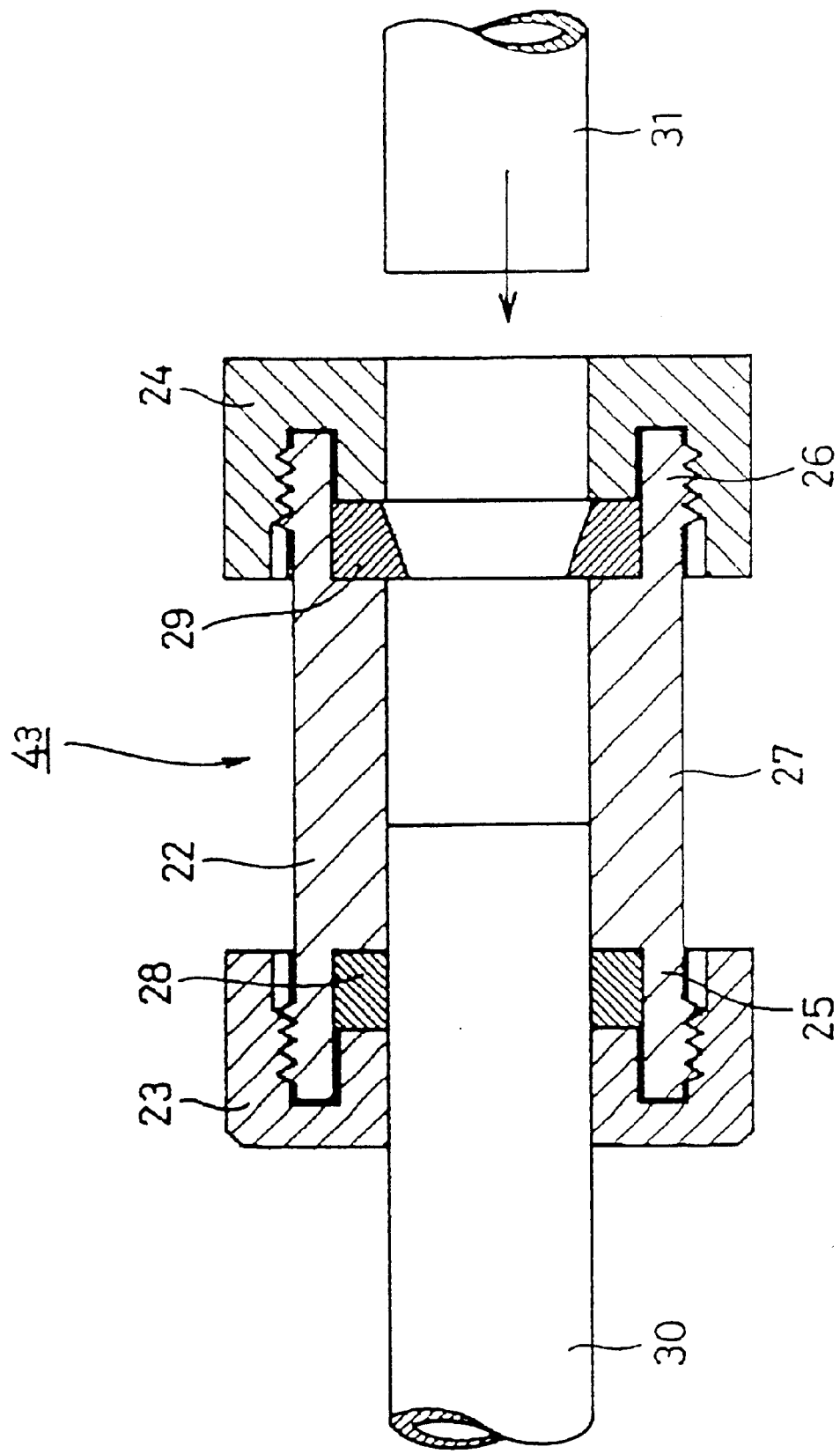
FIG. 4 is a cross-sectional view showing a pipe joint as another embodiment of a pipe made of a rigid thermoplastic resin according to the present invention.

FIG. 4 is a cross-sectional view showing a pipe joint as another embodiment of a pipe made of a rigid thermoplastic resin according to the present invention.

Referring to FIG. 4, a pipe joint (joint structure) 43 includes a pipe main body 22 and two cap nuts 23, 24.

The pipe main body 22 includes two connection mouth portions 25, 26, a straight tube portion 27, and ring-shaped projecting streaks 28, 29 integrally formed on the inside surface of the two connecting mouth portions 25, 26, respectively, and having a sealing property. These ring-shaped projecting streaks have an approximately trapezoidal cross section in a free state and is made of NBR. Referring to the ring-shaped projecting streak 28 of FIG. 4, the sealing property is brought about mainly by pressing contact with a pipe 30 to be connected. Here, the cap nut 23 mainly compresses the ring-shaped projecting streak 28 to allow the ring-shaped projecting streak 28 to be in close adhesion with the pipe 30 to be connected. The ring-shaped projecting streak 29 and the cap nut 24 also produce similar effects. Usually, the cap nuts 23, 24 are threaded beforehand to the pipe main body 22 and, thereafter, the pipes 30, 31 to be connected are inserted and mounted (for example, referring to the pipe 31 to be connected, it is inserted in a direction shown by an arrow).

As described above, by integrally molding the pipe main body 22 and the ring-shaped projecting streaks 28, 29, generation of entanglement (twist) of a sealing material (ring-shaped projecting streaks 28, 29) and leakage of a fluid can be prevented and, also, an improvement can be made in the poorness of the operability accompanying the attachment.

As an alternative to the above-described embodiment, the pipe joint may be an L-shaped joint.

Figure 5:
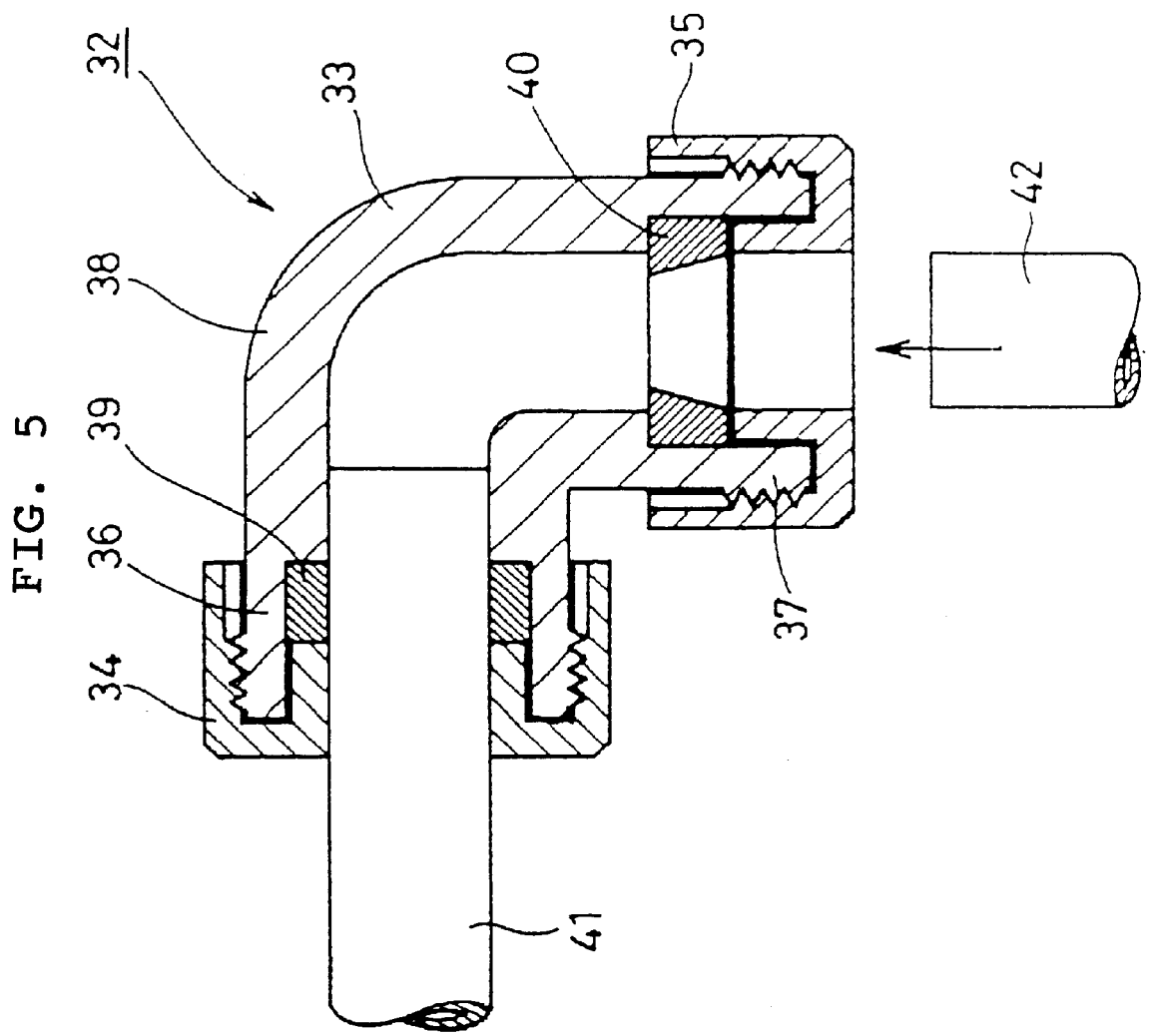
FIG. 5 is a view corresponding to FIG. 4 and showing another embodiment.

FIG. 5 is a view corresponding to FIG. 4 and showing another embodiment.

Referring to FIG. 5, an L-shaped joint 32 includes an L-shaped pipe main body 33 and two cap nuts 34, 35.

The pipe main body 33 includes two connecting mouth portions 36, 37, a bent portion 38, and ring-shaped projecting streaks 39, 40 integrally formed on the inside surface of the two connecting mouth portions 36, 37 and having a sealing property. These ring-shaped projecting streaks have an approximately trapezoidal cross section in a free state, are made of NBR, and produce a sealing effect by pressing contact with the pipes 41, 42 to be connected.

The other constructions and effects are the same as the case of FIG. 4, and explanation will be omitted.

As described above, according to this embodiment 1, the ring-shaped projecting streak can be integrally molded at a special position, namely, the inside surface of the pipe main body or the nut portion by molding the pipe main body or the nut portion and the ring-shaped projecting streak with a combination of respective specific synthetic resins simultaneously or with a time interval, whereby the generation of entanglement (twist) of the sealing material and the leakage of a fluid can be prevented, and also the poorness of the operability accompanying the attachment can be improved.

As an alternative to the above-mentioned embodiment, the ring-shaped projecting streak can be integrally formed on the inside surface of the nut.

Figure 6:
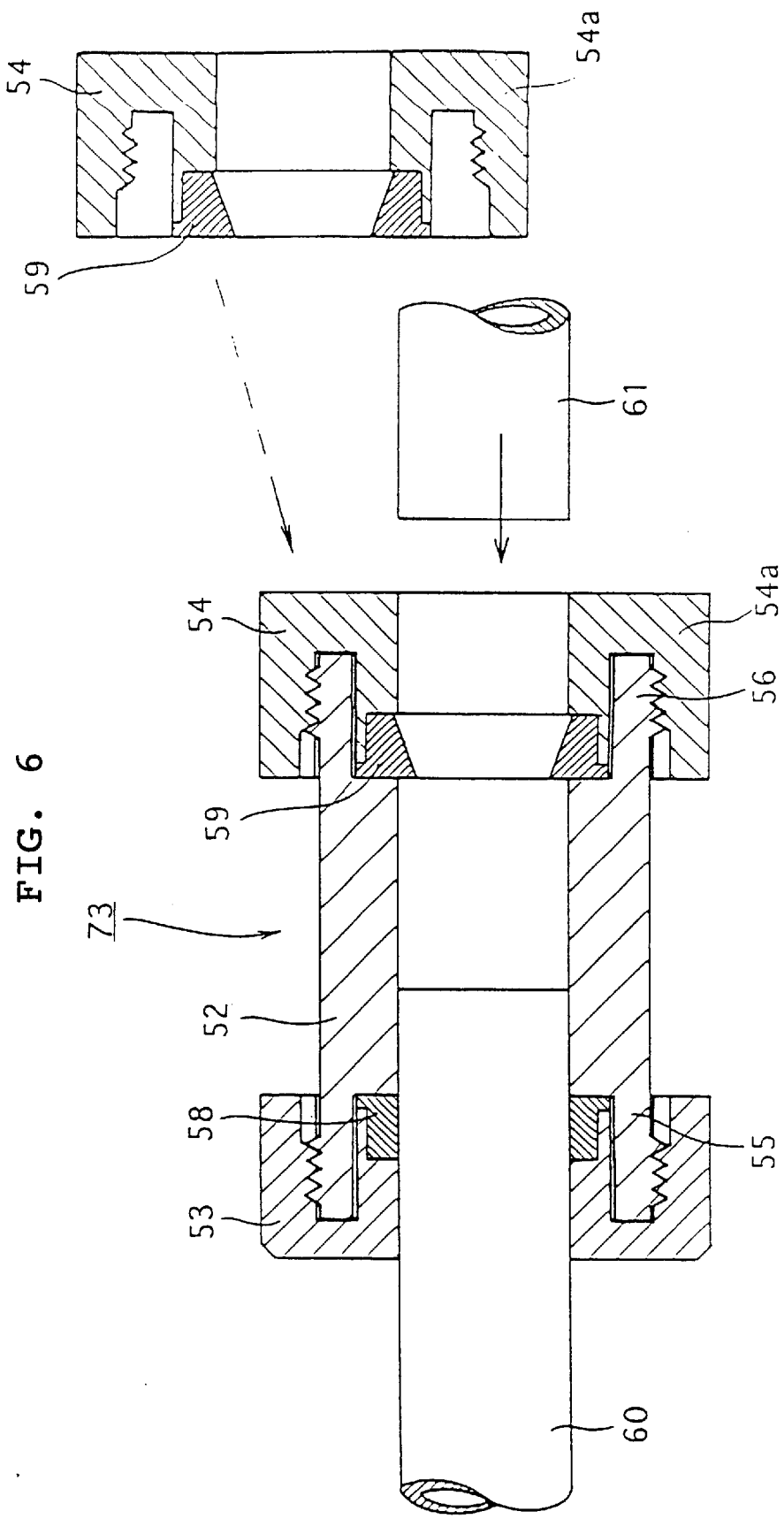
FIG. 6 is a view corresponding to FIG. 4 and showing still another embodiment.

FIG. 6 is a view corresponding to FIG. 4 and showing another embodiment.

Referring to FIG. 6, a pipe joint 73 includes a pipe main body 52 and two sealing nuts 53, 54.

The sealing nut 54 includes a nut portion 54a made of PBT and a ring-shaped projecting streak 59 integrally formed on the inside surface thereof and having a sealing property. As shown separately in a direction of an arrow shown by a broken line in FIG. 6, the ring-shaped projecting streak has an approximately trapezoidal cross section in a free state, is made of NBR, and produces a sealing effect by pressing contact with the pipe main body 52 and the pipe 61 to be connected. The sealing nut 53 also produces a similar effect. Usually, the sealing nuts 53, 54 are threaded to the pipe main body 52 beforehand and thereafter the pipes 60, 61 to be connected are inserted (for example, referring to the pipe 61 to be connected, it is inserted in a direction of an arrow). Here, the numerals 55, 56 represent connecting mouth portions of the pipe main body 22, and the numeral 58 represents a ring-shaped projecting streak of the sealing nut 53.

Here, as a method for manufacturing the sealing nuts 53, 54, for example, a nut portion 54a is molded with a mold, and thereafter NBR in a molten state (unvulcanized state) is injected into a cavity formed by sliding a portion of the mold, and the sealing material is integrally brought into close adhesion while performing vulcanization.

As described above, the position of the sealing material (ring-shaped projecting streaks 58, 59) is fixed by direct integral molding of the nut portion 54a and the ring-shaped projecting streak 59 (without intervention of a third component such as an adhesive), so that generation of entanglement (twist) and leakage of a fluid can be prevented and the poorness of operability accompanying the attachment can be improved.

EMBODIMENT 2

Figure 7:
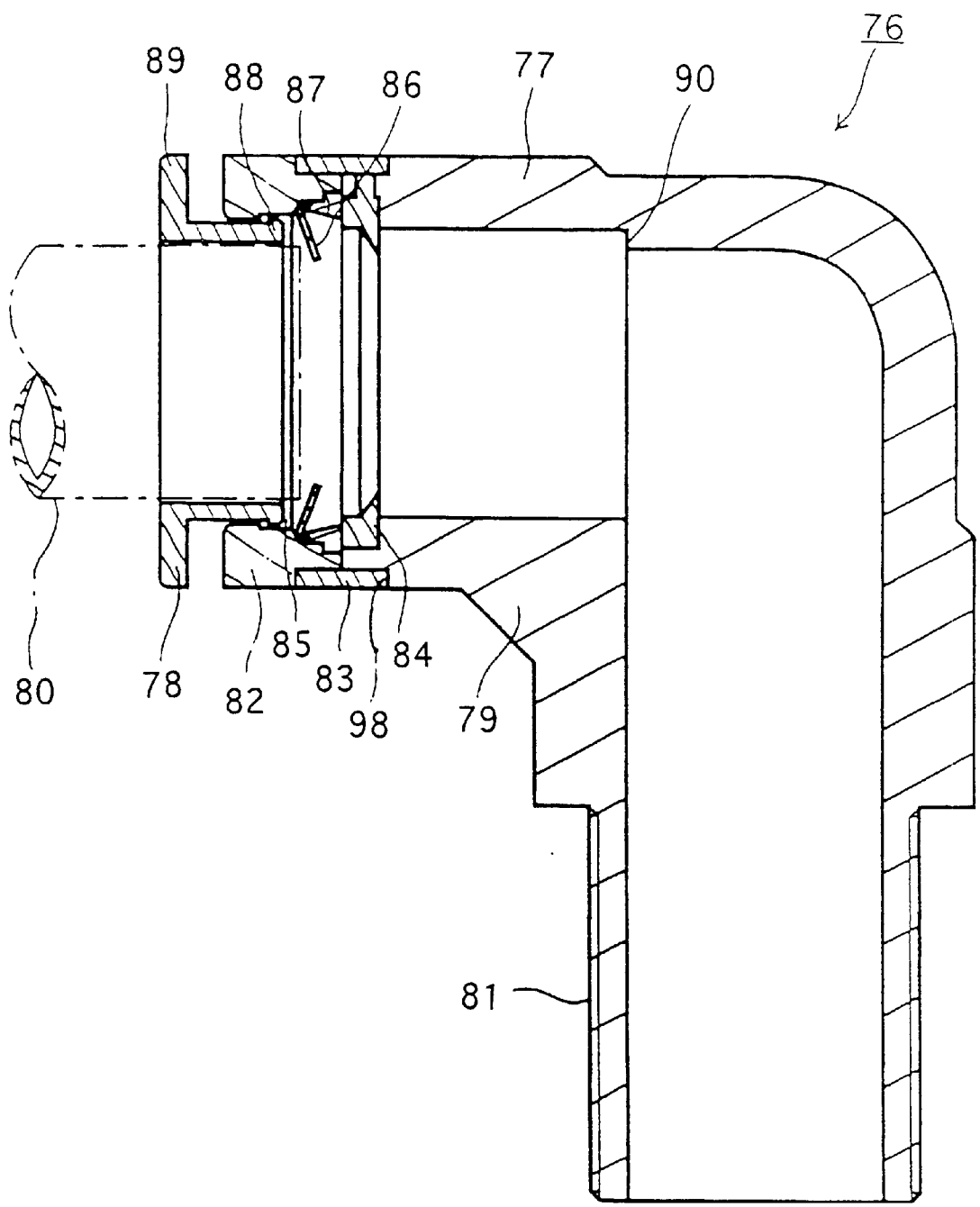
FIG. 7 is a cross-sectional view showing one embodiment of a pipe joint structure according to the present invention.
Figure 8:
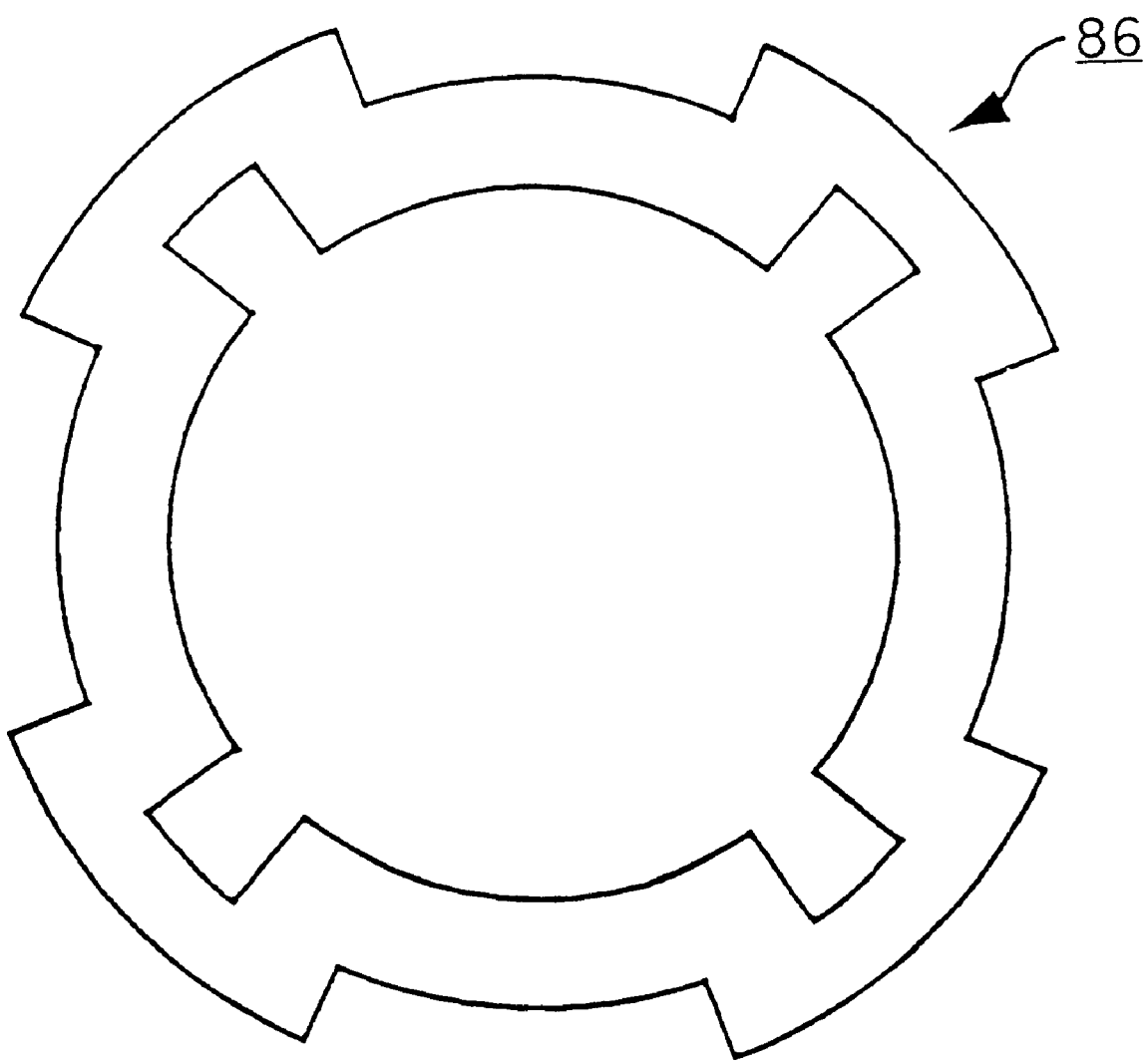
FIG. 8 is a front view of a fixing spring of FIG. 7.

FIG. 7 is a cross-sectional view showing one embodiment of a pipe joint structure according to the present invention; and FIG. 8 is a front view of a fixing spring of FIG. 7.

Referring to FIG. 7, an air-pressure joint 76 as a pipe joint structure mainly includes a pipe main body 77 and a release ring 78 inserted through one opening of this pipe main body. Here, the numeral 80 represents a pipe to be connected.

The pipe main body 77 is formed with polybutylene terephthalate as a rigid thermoplastic resin and includes a main body portion 81 bent approximately in an L-shape, an insertion mouth pipe portion 82 formed of polybutylene terephthalate and disposed to coaxially abut one opening of this main body portion, a ring-shaped connecting portion 83 formed of polybutylene terephthalate and integrally molded to an abutting portion of this insertion mouth pipe portion and the main body portion 81 thereby to integrally connect the two portions, a ring-shaped sealing portion 84 integrally formed on an inner circumferential surface on one opening side of the main body portion 81 and using a butadiene-acrylonitrile rubber as an elastic resin, and a fixing spring 86 made of stainless steel and its holding ring 87 made of a rigid thermoplastic resin which are adjacent to a site nearer to the opening (the one opening side of the main body portion) than the ring-shaped sealing portion. Here, the numeral 79 represents a screw portion formed on an outer circumferential surface of the other opening side, and is threaded to an apparatus (for example, a high pressure air supply source, not shown in the drawings) suitably in an air-tight manner.

The numeral 98 is a recess groove formed at the abutting portion of the insertion mouth pipe portion 82 and the main body portion 81.

The release ring 78 includes a ring-shaped, slip-off preventing protrusion 88 at an outer circumferential portion of a tip end, and includes an outwardly directed flange portion 89 at an outer circumferential portion of a rear end. When the release ring 78 is inserted into the pipe main body 77, it is pressed into the pipe main body 77 until it abuts the outwardly-directed flange portion 89, and then it is pressed back by the fixing spring 86 to be engagingly stopped in the recess groove 85.

Accordingly, referring to FIG. 7, when the pipe 80 to be connected is inserted into the air-pressure joint 76 via the release ring 78, the pipe 80 to be connected presses and broadens the fixing spring 86 and the ring-shaped sealing portion to be engagingly stopped (inserted).

In other words, the pipe 80 to be connected is pressed and engagingly stopped (checked) by the fixing spring 86 to prevent slip-off, and is connected in a sealed state (air-tightly) by elastic contact with the ring-shaped sealing portion 84.

Here, the numeral 90 represents an abutting portion for determining an insertion depth when the pipe 80 to be connected is inserted into the air-pressure joint 76. In pulling out the connected pipe 80, the release ring 78 is pressed a little in the insertion direction of the connected pipe 80 to press and broaden the fixing spring 86 to release the pressing engagement of the connected pipe 80.

Since the air-pressure 76 has the above-mentioned construction, it is not necessary to separately use an O-ring, whereby the cost reduction is made possible, and also a high sealing property is secured to provide an inexpensive joint for a high pressure air (for example, 15 Kgf/cm$^2$) pipe.

Figure 9:
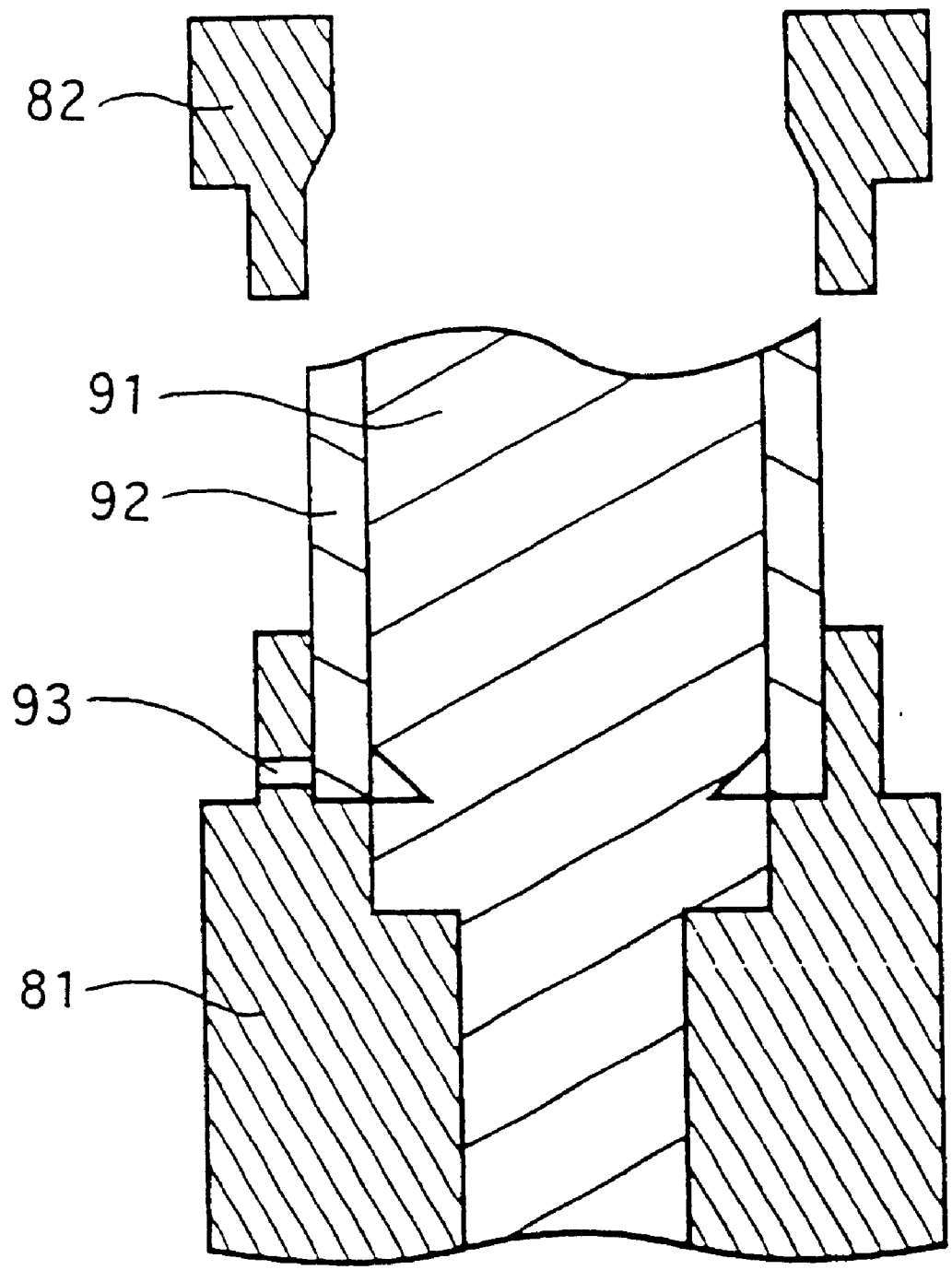
FIG. 9 is a schematic explanatory view of an essential portion that explains a manufacturing method of the pipe joint structure of FIG. 7.
Figure 10:
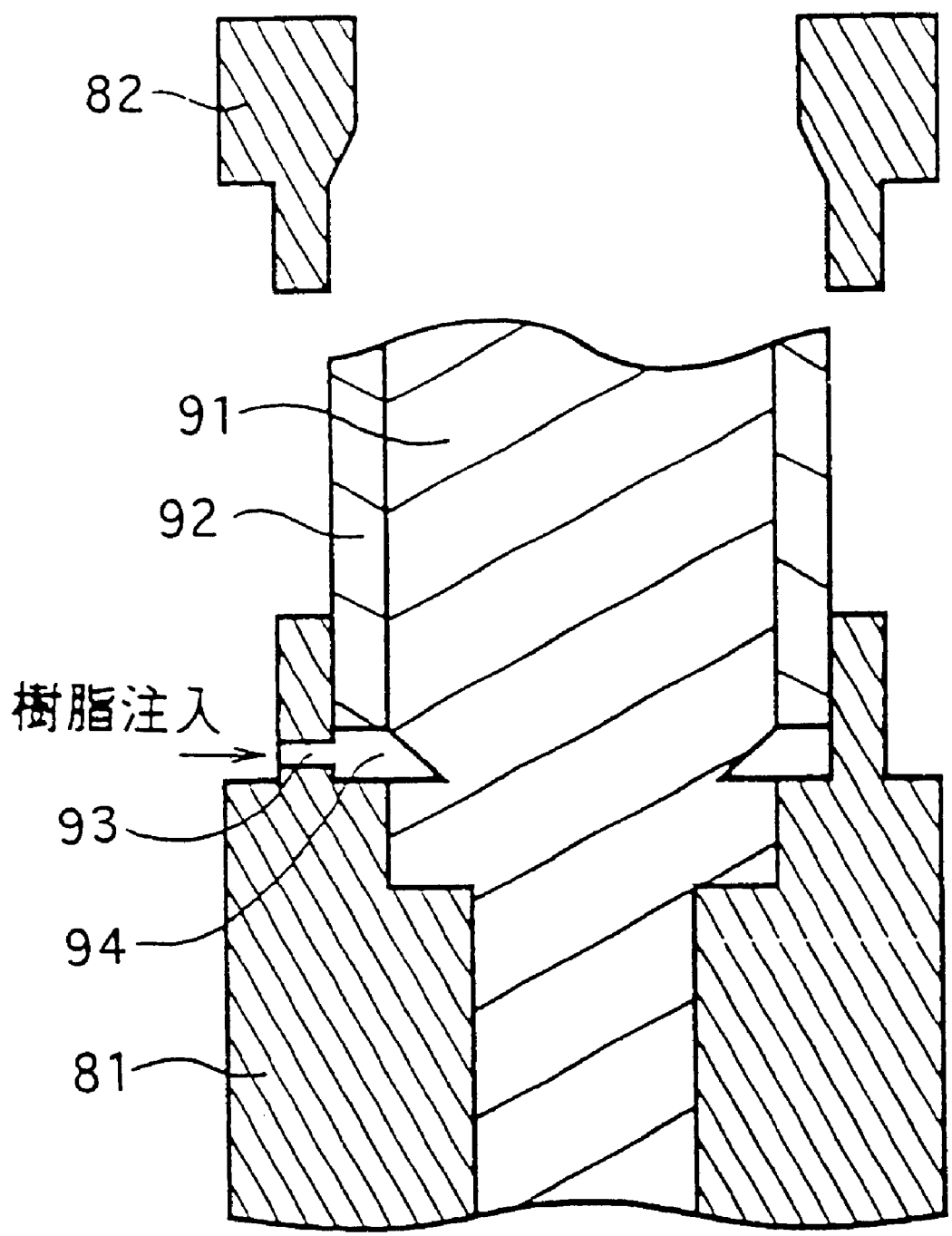
FIG. 10 is a view corresponding to FIG. 9 and showing a next state of FIG. 9.
Figure 11:
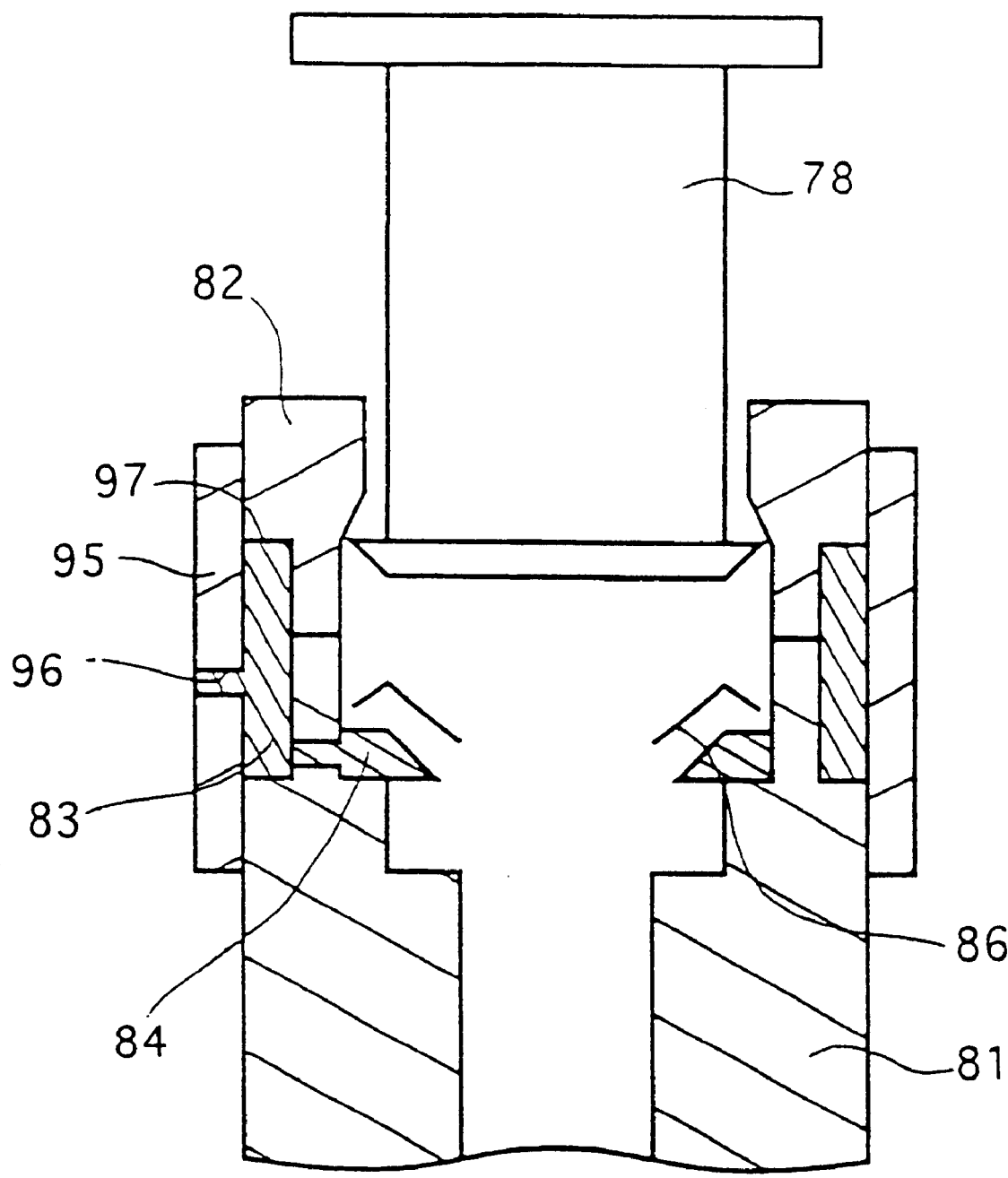
FIG. 11 is a view corresponding to FIG. 9 and showing a next state of FIG. 10.

Next, FIGS. 9 to 11 are schematic explanatory views of an essential portion for explaining a manufacturing method of the air-pressure joint in successive order.

Referring to FIGS. 9 to 11, the molding steps of a pipe main body 77 as an essential portion of an air-pressure joint 76 include:

(1) a main body portion molding step of forming a pipe-shaped cavity (illustration omitted) with a set of molds splittable into a plurality [part of the molds: a center mold (core pin) 91 and a sliding mold 92] and for injecting a molten material (about 245° C.) of a rigid thermoplastic resin (polybutylene terephthalate) into the cavity to mold a main body portion 81 [here, the numeral 93 represents a later-mentioned injection hole (gate) of a molten material molded by a slide pin (illustration omitted)], (2) a sealing portion forming step of slidingly moving a portion of an inner mold (sliding mold 92) among the set of molds to form a small cavity 94 on an inner circumferential surface of the main body portion 81, and injecting a molten material (an unvulcanized molten body as a source material of a rubber, about 240° C.) of an elastic resin (butadiene-acrylonitrile rubber) into the small cavity via the injection hole 93 to integrally form a ring-shaped sealing portion 84 on the inner circumferential surface of the main body portion 81 by vulcanization, (3) an insertion mouth pipe molding step of forming a pipe-shaped cavity (illustration omitted) by means of another set of molds (illustration omitted) splittable into a plurality, and injecting a molten material (about 245° C.) of a rigid thermoplastic resin (polybutylene terephthalate) into the cavity to mold an insertion mouth pipe portion 82, and (4) a pipe main body forming step of disposing the molded insertion mouth pipe portion 82 and the molded main body portion 81 coaxially in abutment, forming a cavity 97 by means of still another set of molds (outer mold 95; here the center mold 91 is removed together with the sliding mold 92 by pressing and broadening the ring-shaped sealing portion 84) on an outer circumferential surface portion of their abutting portion, and injecting a molten material (about 245° C.) of a ridge thermoplastic resin (poly butylene terephthalate) into the cavity via the injection hole 96 to mold a ring-shaped connecting portion 83 to form a pipe main body 77 having the main body portion 81 and the insertion mouth pipe portion 82 integrally connected (the main body portion 81 and the insertion mouth pipe portion 82 are welded by a temperature of the molten material).

Here, the release ring 78 is molded by forming a pipe-shaped cavity (illustration omitted) by means of a set of molds (illustration omitted) splittable into a plurality, and injecting a molten material (about 245° C.) of a rigid thermoplastic resin (polybutylene terephthalate) into the cavity. Also, a method of moving the sliding mold 92 of (2) is referred to as Die Slide Injection (DSI) and is described in detail in Japanese Examined Patent Publication No. HEI 02(1990)-38377.

According to this embodiment 2, an inexpensive pipe joint structure having a high sealing property can be made by integrally forming a ring-shaped sealing portion made of an elastic resin on an inner circumferential surface of a main body portion made of a rigid thermoplastic resin, bringing the main body portion and an insertion mouth portion in coaxial abutment and integrally connecting them so as to form a recess groove on an inner circumferential surface of their abutting portion, especially by integrally forming the main body portion and the ring-shaped sealing portion with a combination of a specific rigid thermoplastic resin and a specific elastic resin, and molding the pipe main body in advance by dividing the pipe main body (main body portion and insertion mouth pipe portion) with a plane passing through the recess groove, and thereafter integrally connecting them.

EMBODIMENT 3

Figure 12:
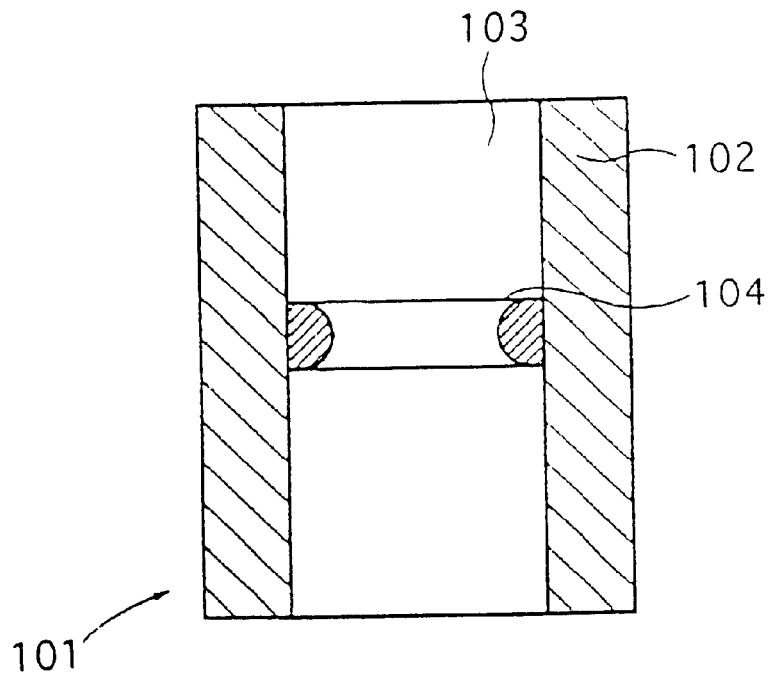
FIG. 12 is a cross-sectional view of a pipe joint manufactured by an embodiment of a manufacturing method of the present invention.

FIG. 12 is across-sectional view of a simple embodiment of a pipe joint structure manufactured according to a manufacturing method of the present invention.

Figure 13:
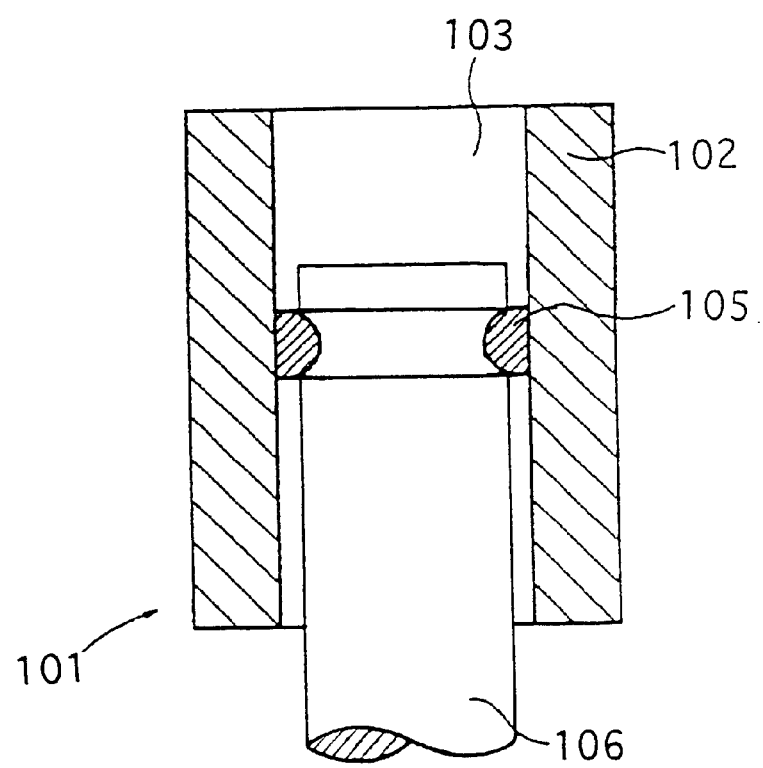
FIG. 13 is a cross-sectional view of the pipe joint showing a state at the time of manufacturing the pipe joint of FIG. 12.

Referring to FIG. 12, a pipe joint 101 includes a pipe main body 102 made of a thermoplastic resin and a ring-shaped rubber layer 104 integrally fixed in close adhesion generally at a center of an inner circumferential surface of this pipe main body. Regarding materials to be used for the pipe main body 102 and the ring-shaped rubber layer 104, combinations of Examples 1 to 4 of Table 1 shown below were used as principal compositions for the thermoplastic resin and the rubber so that the materials would be made into a molded article having a high adhesion to each other. FIG. 13 is a cross-sectional view showing a state at the time of manufacturing the pipe joint of FIG. 12.

TABLE 1

| Materials to be used for the respective portions | | |
|---|---|---|
| Examples | 1 | 2 |
| Resin pipe main body | PPE resin (Vestoran 1900) | PPE resin (Vestoran 1900) |
| Ring-shaped rubber layer | SBR 1500 70 EPDM 30 Carbon black 50 | NR 70 SBR 1500 30 Carbon black 20 |
| Examples | 3 | 4 |
| Resin pipe main body | PA resin (Vestamid X7099) | PA resin (Vestamid X7099) |
| Ring-shaped rubber layer | XNBR 100 Silica 60 | XNBR 100 Carbon black 50 |

Pipe bodies 102 (outer diameter 23 mm, inner diameter 17 mm) made of a thermoplastic resin were manufactured by using the materials of Examples 1 to 4 shown in Table 1 respectively by means of an injection molding machine. Also, as materials for forming ring-shaped rubber layers 104, clay-like materials having blending ratios shown in Examples 1 to 4 of Table 1 and obtained respectively by adding, for kneading, a paraffin oil as a softening agent for kneading; stearic acid as an activating agent; zinc white, N-cyclohexyl-2 as a vulcanization promoting agent; and sulfur, surface-treated sulfur as a vulcanizing agent [here, a glycol derivative as a plasticizer, BDMA or TAIC as a vulcanization promoting agent, and organic peroxide as a vulcanizing agent were used in the case of XNBR (acid-modified NBR)] were well kneaded by a roll and molded into a plate shape. Ring-shaped unvulcanized rubber pieces (outer diameter: about 16 mm, transversal cross section: about 1 mm×about 1 mm) were stamped out from this plate-shaped unvulcanized rubber.

The ring-shaped unvulcanized rubber stamped out in this manner were respectively inserted into an inner circumferential surface 103 of the pipe main body 102 made of a thermoplastic resin, using the combinations of Examples 1 to 4 of Table 1. A cylindrical body 106 made of aluminum having a diameter approximately equal to or a little larger than the inner diameter of the ring-shaped unvulcanized rubber 105 was inserted into the ring of the ring-shaped unvulcanized rubber 105 so that the ring-shaped unvulcanized rubber 105 closely adheres to an inner circumferential surface 103 of the pipe main body 102, as shown in FIG. 13, whereby the unvulcanized rubber 105 was pressed onto the inner circumferential surface 103 of the pipe main body 102 and, in this state, the rubber was vulcanized by heating in a high temperature tank of 170° C. for five minutes. At this time of vulcanization, the ring-shaped rubber 105 was fixed in close adhesion onto the inner circumferential surface 103 of the pipe main body 102 made of the thermoplastic resin, and the ring-shaped rubber layer 104 was integrally formed on the inner circumferential surface 103 of the pipe main body 102.

After cooling, the cylindrical body 106 made of aluminum was removed, and the adhesion state of the ring-shaped rubber layer 104 to the pipe main body 102 made of the thermoplastic resin was examined. It was confirmed that, in all the combinations of Examples 1 to 4, the ring-shaped rubber layer 104 and the pipe main body 102 were integrally adhered until cohesive failure of the rubber component occurred.

Here, in performing this vulcanization, the cylindrical body 106 made of aluminum shown in FIG. 13 may be removed, and thereafter the ring-shaped rubber 105 in a state of close adhesion to the inner circumferential surface 103 of the pipe main body 102 may be heated in a high temperature tank.

Figure 14:
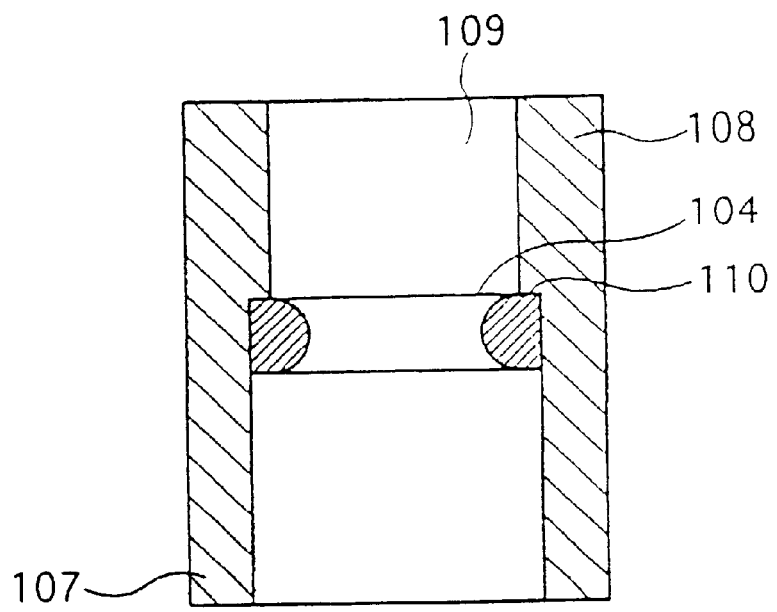
FIG. 14 is a cross-sectional view of a pipe joint manufactured by another embodiment of a manufacturing method of the present invention.
Figure 15:
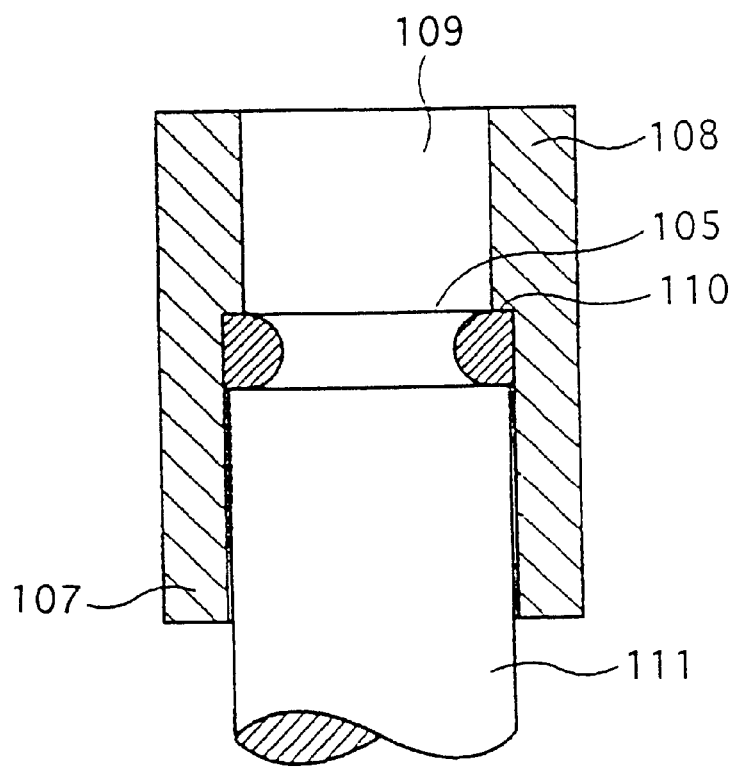
FIG. 15 is a cross-sectional view showing a state at the time of manufacturing the pipe joint of FIG. 14.

FIG. 14 is a cross-sectional view of a pipe joint manufactured by another embodiment of the manufacturing method of the present invention. FIG. 15 is a cross-sectional view showing a state at the time of manufacturing the pipe joint of FIG. 14.

In this embodiment, a ring-shaped step portion 110 is formed beforehand on an inner circumferential surface 109 of the pipe main body 108 in FIG. 15. A ring-shaped unvulcanized rubber 105 is inserted to abut this step portion 110, and further a cylindrical body 111 made of aluminum having a diameter approximately equal to the outer diameter of the ring-shaped unvulcanized rubber 105 is inserted. The ring-shaped unvulcanized rubber 105 pressed in this manner by an end portion of the cylindrical body 111 made of aluminum deforms freely and closely contacts the step portion 110 and the inner circumferential surface 109 of the pipe main body 108.

Figure 16:
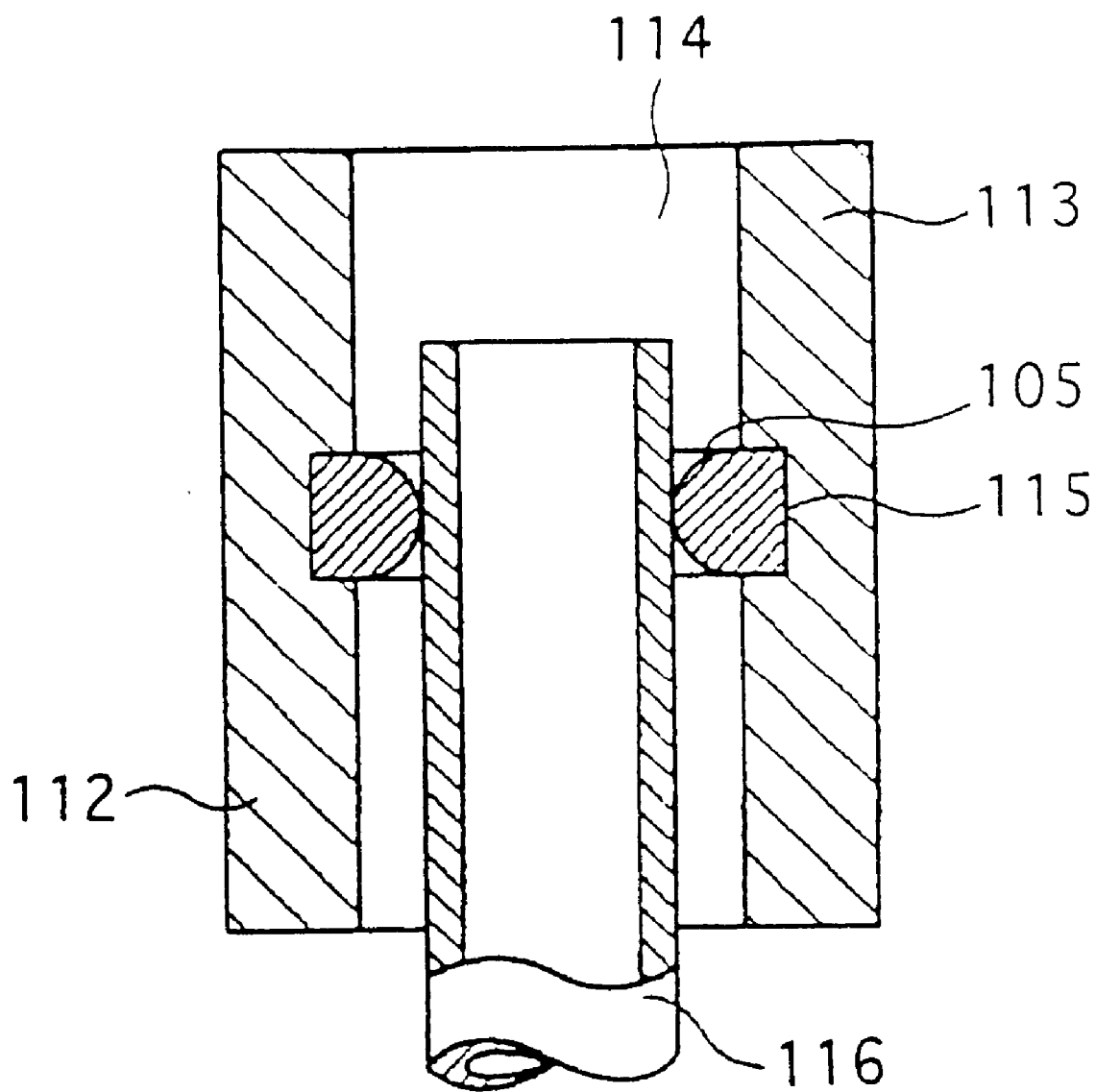
FIG. 16 is a cross-sectional view showing another embodiment of a manufacturing method of the present invention.

Here, instead of the step portion 110, a ring-shaped groove 115 may be formed in an inner circumferential surface 114 of the pipe main body 113, as shown in FIG. 16 and, after the ring-shaped unvulcanized rubber 105 is disposed in the ring-shaped groove, a tubular body 116 made of aluminum and having a diameter approximately equal to the inner diameter of the ring-shaped unvulcanized rubber 105 may be inserted to allow the ring-shaped unvulcanized rubber 105 to be in close contact with the inner circumferential surface 114 and the ring-shaped groove 115 of the pipe main body 113. Also, instead of the tubular body 116 made of aluminum, a cylindrical body 106 made of aluminum such as shown in FIG. 13 may be used.

For the pipe main body 108 and the ring-shaped unvulcanized rubber 105 in the state of FIG. 15 and set respectively with the combinations of Examples 1 to 4 in the above Table 1, a heat source (illustration omitted) that can be set at an arbitrary temperature was connected to the other end portion of the cylindrical body 111 made of aluminum, and the ring-shaped unvulcanized rubber 105 was set at 180° C. and heated for three minutes.

After cooling, the cylindrical body 111 made of aluminum was removed. It was confirmed that, in all the combinations of Examples 1 to 4 of the above Table 1, the ring-shaped rubber layer 104 and the main body 108 were integrally adhered until cohesive failure of the rubber occurred, in the same manner as in the pipe joint 1 of the embodiment of FIG. 12.

Both of the element 107 and element 112 indicate pipe joints as understood from FIGS. 14–16.

The manufacturing method explained in the above is applicable to manufacture of pipe joints of various forms.

Figure 17:
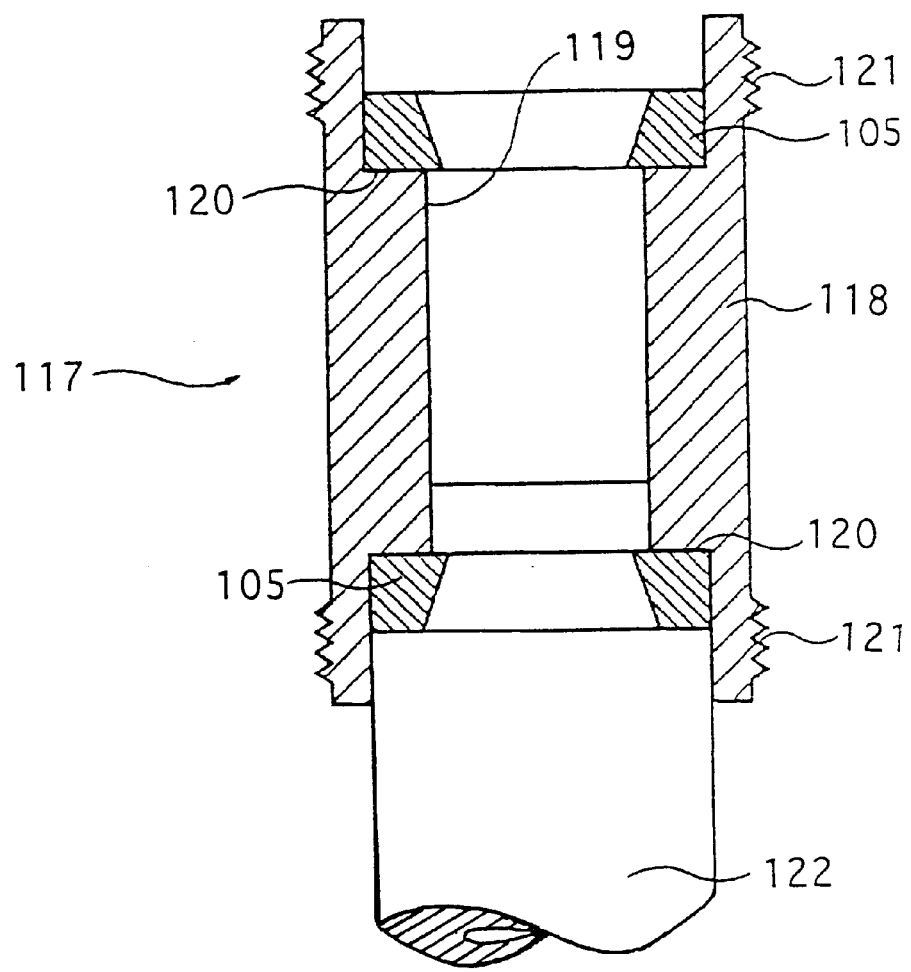
FIG. 17 is a cross-sectional view showing a state at the time of manufacture of the pipe joint manufactured by another embodiment of a manufacturing method of the present invention.
Figure 18:
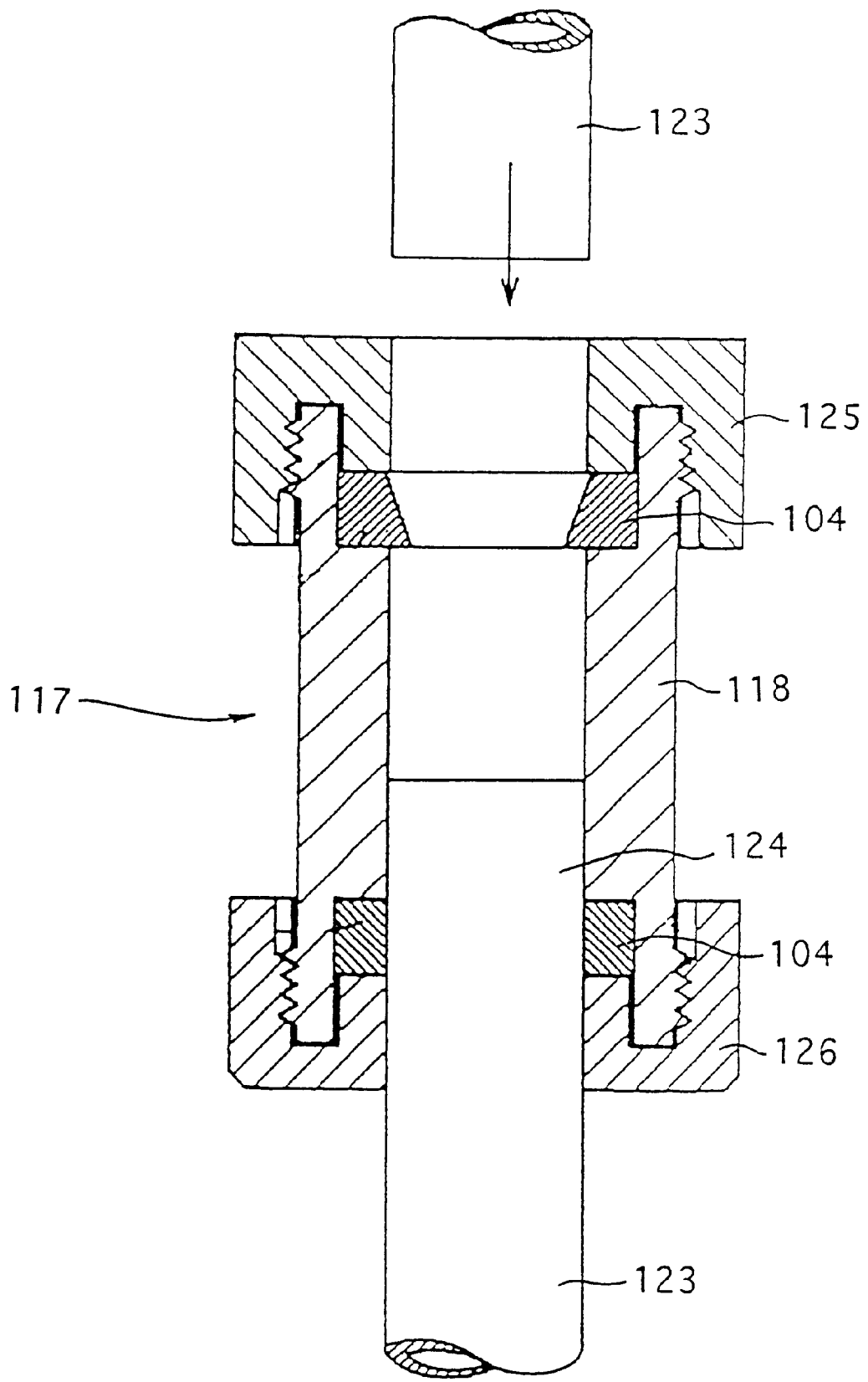
FIG. 18 is a cross-sectional view showing a state at the time of using the pipe joint of FIG. 17.

FIG. 17 is a view showing a state at the time of manufacturing a specific pipe joint. FIG. 18 is a view showing a state of actual use of the pipe joint of FIG. 17.

First, referring to FIG. 17, ring-shaped step portions 120 are formed beforehand on an inner circumferential surface 119 on both sides of a pipe main body 118, and a male screw 121 is formed on an outer circumferential surface on both sides of the pipe main body 118. Unvulcanized ring-shaped rubbers 105 are respectively disposed to abut the step portions 120 of the pipe main body 118 thus formed, and further, tubular bodies 122 made of aluminum and having a diameter approximately equal to or a little larger than the inner diameter of the ring-shaped unvulcanized rubbers 105 and tapered on a portion of the circumferential side surface to be adapted to an inclination of the inner circumferential surface of the ring-shaped unvulcanized rubbers 105 are respectively inserted into the rings of the ring-shaped unvulcanized rubbers 105, whereby the ring-shaped unvulcanized rubbers 105 are pressed and fixed onto the inner circumferential surface 119 and the step portion 120 of the pipe main body 118. Thereafter, for the pipe main body 118 and the ring-shaped unvulcanized rubbers 105, a heat source body (illustration omitted) was connected to the other end portion of the tubular body 122 made of aluminum in the same manner as the above Examples to set the ring-shaped unvulcanized rubbers 105 at 160° C. and heated for seven minutes via the tubular body 122 made of aluminum, which is a good heat conductor.

After cooling, the tubular body 122 made of aluminum was removed. It was confirmed that the vulcanized ring-shaped rubber layers 104 were formed in integral close adhesion to the pipe main body 118, as shown in FIG. 18, and that, for all the combinations of the Examples 1 to 4 of the above Table 1, the ring-shaped rubber layers 104 were integrally adhered to the pipe main body 118 until cohesive failure of the ring-shaped rubber layers 104 occurred, in the same manner as in the above Examples.

A Pressure resistant hoses 123 made of rubber were respectively inserted through both end portion of the pipe joint 117 thus manufactured and shown in FIG. 18 until their circumferential side surfaces 124 reached the ring-shaped rubber layers 104. Cap-shaped flanges 125.126 for preventing slip-off of the hoses were screwed to both end portions of the pipe main body 118 to firmly fix the pressure-resistant hoses 123 made of rubber. Thereafter, high pressure air of 5 kg/cm$^2$ was allowed to pass in the hoses and, in all the pipe joints 117 manufactured with the combinations of Examples 1 to 4 of the above Table 1, leakage of air was not generated and a high sealing property could be confirmed.

Figure 19:
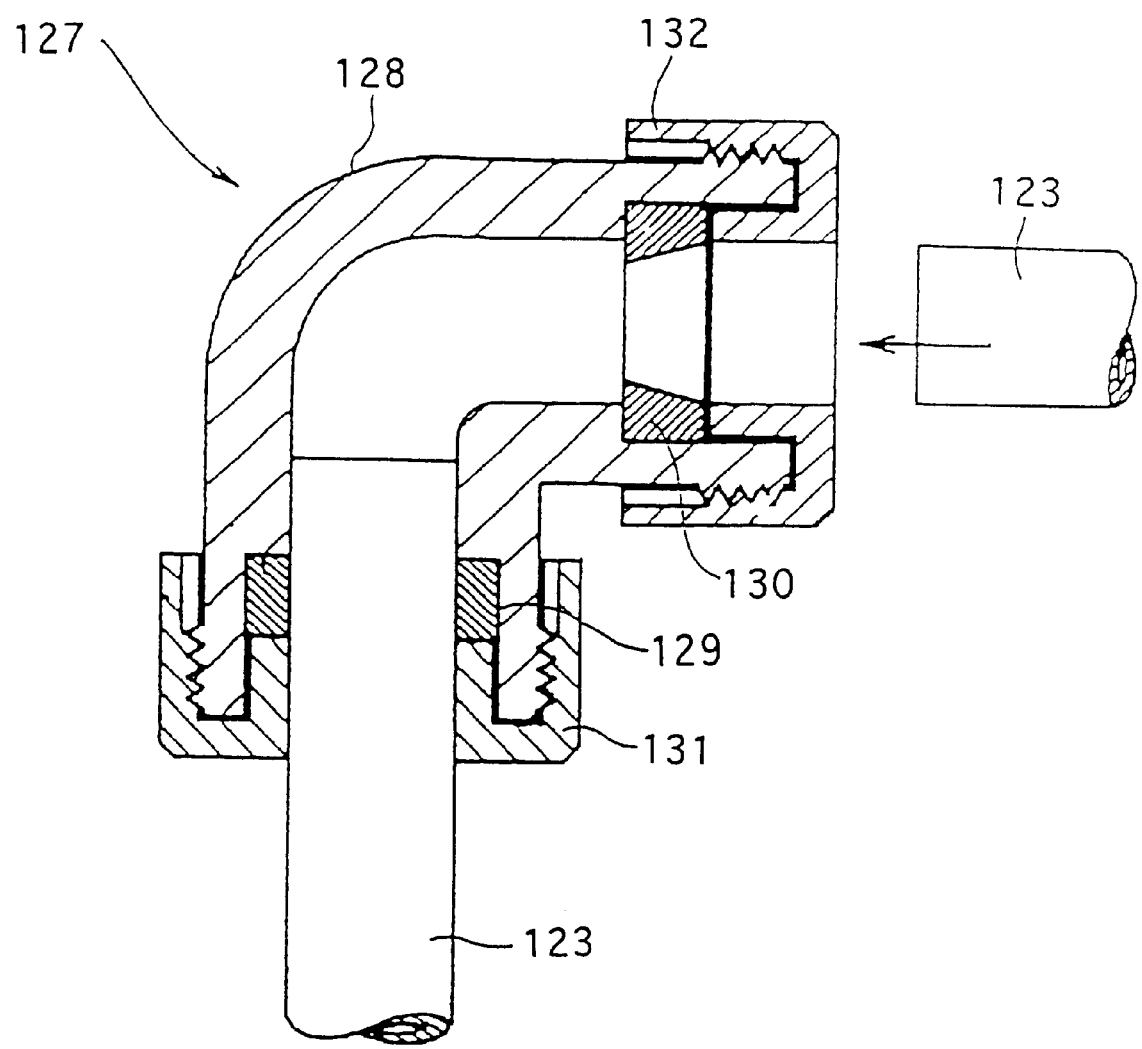
FIG. 19 is a cross-sectional view of a pipe joint manufactured by another embodiment of a manufacturing method of the present invention.

Also, the manufacturing method of the present invention can be applied to an L-shaped pipe joint (Elbow) 127 shown in FIG. 19. In this L-shaped pipe joint 127, a pipe main body 128 is bent by 90° generally at the center of its longitudinal direction. However, the other constructions, the materials to be used, and the manufacturing methods are the same as the pipe joint 117 manufactured in the embodiments shown in FIG. 17 and FIG. 18.

Here, numerals 129, 130 represent ring-shaped rubber layers formed in integral close adhesion to the pipe main body 128 by vulcanization, and the numerals 131, 132 represent cap-shaped flanges.

Thus, the manufacturing method of the present invention can be applied to pipe joints of various forms.

As described above, according to the embodiment 3, by vulcanizing the unvulcanized ring-shaped rubber while keeping it in close contact with the inner circumferential surface of the pipe made of the thermoplastic resin, the unvulcanized rubber can be vulcanized after it is deformed in close adhesion in correspondence with the shape of the inner surface of the pipe main body by utilizing its large deformability, whereby the vulcanized rubber can be closely adhered to the inner circumferential surface of the pipe main body in a free state instead of elastic deformation and a large sealing effect can be obtained. This action effect makes it possible to provide a pipe joint having a high reliability in which leakage of a fluid caused by a weld line of the pipe main body is not generated. Also, since the pipe main body made of a thermoplastic resin and the ring-shaped rubber for sealing, which were conventionally separate components, are integrally molded beforehand (before using it as a pipe joint), the problem of poorness of the assembling property and the operability caused by the twist or entanglement of the above mentioned ring-shaped rubber or ring-shaped gasket for sealing can be eliminated.

What is claimed is:

1. A manufacturing method of a pipe made of a rigid thermoplastic resin in which a ring-shaped projection is thermoplastically integrated on an inner surface of a pipe main body, comprising:

a pipe main body molding step of molding the pipe main body made of the rigid thermoplastic resin by injecting a molten material of a polyamide resin, a polybutylene terephthalate resin, or a polyphenylene oxide resin into a pipe-shaped cavity formed by splittable molds, and a ring-shaped projection molding step of injecting a molten material of a butadiene-acrylonitrile rubber or an ethylene-propylene rubber into a ring-shaped cavity formed along the inner surface of the pipe main body by the molds themselves or combining another mold, and thermoplastically integrating the ring-shaped projection made of an elastic resin and having a sealing property on the inner surface of the pipe main body while performing vulcanization, and wherein the ring-shaped projection is thermoplastically integrated on the inner surface of the pipe main body by mounting in the mold a slide pin that pierces a pipe-shaped cavity formed by the mold and injecting the molten material of the polyamide resin, the polybutylene terephthalate resin, or the polyphenylene oxide resin into the cavity to mold the pipe main body in the pipe main body molding step; and then injecting the molten material of the butadiene-acrylonitrile rubber or the ethylene-propylene rubber into the ring-shaped cavity via a slide-pin's drawing hole of the previously molded pipe main body in the ring-shaped projection molding step.

2. A pipe joint structure comprising a pipe main body made of a rigid thermoplastic resin, a release ring inserted from one opening of the pipe main body, an insertion mouth pipe portion made of a rigid thermoplastic resin which is molded separately from the pipe main body and allowed to coaxially abut the pipe main body to be integrally connected therewith, and a ring-shaped projection made of an elastic resin formed on an inner surface of the pipe main body for sealing a pipe to be connected that is inserted via the release ring, wherein the rigid thermoplastic resin of the pipe main body is a polyamide resin, a polybutylene terephthalate resin or a polyphenylene oxide resin, the elastic resin is a butadiene-acrylonitrile rubber or an ethylene-propylene rubber, the ring-shaped projection is thermoplastically integrated on the inner surface of the pipe main body by vulcanization of a molten material of the rubber, the release ring is formed of a rigid thermoplastic resin or a metal and includes a slip-off preventing protrusion on an outer circumferential surface of its insertion site, and a recess groove is formed on an inner circumferential surface of an abutting portion of the pipe main body and the insertion mouth pipe portion for engaging or engagingly stopping the slip-off preventing protrusion of the release ring, wherein the main body portion and the insertion mouth pipe portion are integrally connected by integrally molding or winding a ring-shaped connecting portion made of a rigid thermoplastic resin on an outer circumferential surface of their abutting portion.

3. A pipe joint structure comprising a pipe main body made of a rigid thermoplastic resin, a release ring inserted from one opening of the pipe main body, an insertion mouth pipe portion made of a rigid thermoplastic resin which is molded separately from the pipe main body and allowed to coaxially abut the pipe main body to be integrally connected therewith, and a ring-shaped projection made of an elastic resin formed on an inner surface of the pipe main body for sealing a pipe to be connected that is inserted via the release ring, wherein the rigid thermoplastic resin of the pipe main body is a polyamide resin, a polybutylene terephthalate resin or a polyphenylene oxide resin, the elastic resin is a butadiene-acrylonitrile rubber or an ethylene-propylene rubber, the ring-shaped projection is thermoplastically integrated on the inner surface of the pipe main body by vulcanization of a molten material of the rubber, the release ring is formed of a rigid thermoplastic resin or a metal and includes a slip-off preventing protrusion on an outer circumferential surface of its insertion site, and a recess groove is formed on an inner circumferential surface of an abutting portion of the pipe main body and the insertion mouth pipe portion for engaging or engagingly stopping the slip-off preventing protrusion of the release ring, wherein the main body portion and the insertion mouth pipe portion are integrally connected by integrally molding or winding a ring-shaped connecting portion made of a rigid thermoplastic resin on an outer circumferential surface of their abutting portion, and wherein the pipe main body has an injection hole for injecting a molten material of the butadiene-acrylonitrile rubber or the ethylene-propylene rubber from outside for forming the ring shaped projection made of the elastic resin, and the injection hole is closed by the ring-shaped connecting portion after the molten material of the rubber is injected.

4. The pipe joint structure of claim 12 or 13, wherein the main body portion further includes, on its inner circumferential surface, a fixing spring capable of pressing and stopping the pipe to be connected that is inserted via the release ring and capable of releasing the pressing and stopping by deformation by a pushing operation of the release ring.

5. A manufacturing method of a pipe joint structure in which a ring-shaped projection made of an elastic resin and having a sealing property is thermoplastically integrated on an inner surface of a pipe main body, comprising (1) a pipe main body portion molding step for molding a pipe main body portion made of the rigid thermoplastic resin by injecting a molten material of a polyamide resin, a polybutylene terephthalate resin, or a polyphenylene oxide resin-into a pipe-shaped cavity formed by splittable molds;

(2) a ring-shaped projection forming step for injecting a molten material of a butadiene-acrylonitrile rubber or an ethylene-propylene rubber into a small cavity formed on the inner surface of the pipe main body portion by moving a part of an inner mold among the molds, and for thermoplastically integrating the ring-shaped projection made of the elastic resin and having the sealing property on an inner surface of the pipe main body portion while performing vulcanization;

(3) an insertion mouth pipe portion molding step for molding an insertion mouth pipe portion by injecting a molten material of a rigid thermoplastic resin into a pipe-shaped cavity formed by other splittable molds; and (4) a pipe main body molding step for obtaining the pipe main body by coaxially and abuttingly disposing the molded insertion mouth pipe portion and the molded pipe main body portion, and injecting a molten material of a rigid thermoplastic resin into a cavity formed by still another mold on an outer circumferential surface portion of the abutting portion to mold a ring-shaped connecting portion to integrally connect the pipe main body portion and the insertion mouth pipe portion; and (5) a release ring inserting step for molding a release ring beforehand and inserting the molded release ring into the obtained pipe main body to obtain a pipe joint.

6. A manufacturing method of a pipe joint structure in which a ring-shaped projecting streak made of an elastic resin and having a sealing properly is thermoplastically integrated on an inner surface of a pipe main body, comprising a pipe main body molding step for molding the pipe main body made of a rigid thermoplastic resin by injecting a molten material of a polyamide resin, a polybutylene terephthalate resin or a polyphenylene oxide resin into a pipe-shaped cavity formed by splittable molds, and a ring-shaped projection molding step for thermoplastically integrating the ring-shaped projection made of an elastic resin and having a sealing property on an inner surface of the molded pipe main body by vulcanizing a clay-like material of a butadiene-acrylonitrile rubber or an ethylene-propylene rubber, wherein the clay-like material of the rubber is made into a ring shape beforehand and vulcanized while allowing it to be in close contact with the pipe main body in performing vulcanization.

7. The manufacturing method of the pipe joint of claim 6, wherein the clay-like material of the butadiene-acrylonitrile rubber or the ethylene-propylene rubber is made into a plate shape beforehand and then is stamped out into a ring-shape.

8. The manufacturing method of the pipe joint of claim 6, wherein the clay-like material of the butadiene-acrylonitrile rubber or the ethylene-propylene rubber is made into a ring shape and these materials are pressed into close contact with the inner surface of the pipe main body by inserting a cylindrical body or a tubular body into the ring.

9. The manufacturing method of the pipe joint of claim 6, wherein the rubber is brought into close contact with the inner surface of the pipe main body by forming a ring-shaped step portion on an inner surface of the pipe main body beforehand, and pressing the clay-like material of the butadiene acrylonitrile rubber or the ethylene-propylene rubber, which is made into a ring-shape, onto the step portion by means of an end portion of the cylindrical body or the tubular body.

10. The manufacturing method of the pipe joint of claim 8 or 9, wherein the clay-like material of the butadiene acrylonitrile rubber or the ethylene-propylene rubber is vulcanized by heating the cylindrical body or the tubular body.

11. The manufacturing method of the pipe joint of claim 6 or 7, wherein the clay-like material of the butadiene acrylonitrile rubber or the ethylene-propylene rubber is vulcanized by heating the material with the pipe main body in a high temperature tank.

12. The manufacturing method of the pipe joint of claim 8 or 9, wherein the clay-like material of the butadiene acrylonitrile rubber or the ethylene-propylene rubber is vulcanized by heating the material with the pipe main body and the cylindrical body or the tubular body in a high temperature tank.

* * * * *